United States Patent
Tu

(10) Patent No.: US 10,929,628 B2
(45) Date of Patent: *Feb. 23, 2021

(54) QR CODE POSITIONING METHOD AND APPARATUS

(71) Applicant: Advanced New Technologies Co., Ltd., Grand Cayman (KY)

(72) Inventor: Yinhai Tu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/908,967

(22) Filed: Jun. 23, 2020

(65) Prior Publication Data
US 2020/0320265 A1 Oct. 8, 2020

Related U.S. Application Data

(63) Continuation of application No. 16/697,833, filed on Nov. 27, 2019, now Pat. No. 10,706,248, which is a
(Continued)

(30) Foreign Application Priority Data
Sep. 27, 2017 (CN) .......................... 20171088105.9

(51) Int. Cl.
*G06K 7/14* (2006.01)

(52) U.S. Cl.
CPC ......... *G06K 7/1443* (2013.01); *G06K 7/1417* (2013.01)

(58) Field of Classification Search
CPC ... G06K 7/1443; G06K 7/1452; G06K 7/1417
(Continued)

(56) References Cited

U.S. PATENT DOCUMENTS

| 6,786,412 B2 | 9/2004 | Shimizu |
| 10,706,248 B2 | 7/2020 | Tu |

(Continued)

FOREIGN PATENT DOCUMENTS

| CN | 104517089 | 4/2015 |
| CN | 104517090 | 4/2015 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Allyson N Trail
(74) *Attorney, Agent, or Firm* — Fish & Richardson P.C.

(57) ABSTRACT

Implementations of the present application provide a QR code positioning method and apparatus. Based on a predetermined pixel detection rule, centers of candidate position detection patterns in the QR code image are determined from a QR code image that includes first-type pixels and second-type pixels. The predetermined pixel detection rule includes that a consecutive arrangement ratio of the first-type pixels, the second-type pixels, and the first-type pixels satisfies a predetermined ratio. The candidate position detection patterns are identified based on the centers of the candidate position detection patterns. A set of patterns that satisfies a QR code image positioning rule are determined from the candidate position detection patterns. The set of patterns are used as position detection patterns of the QR code image.

20 Claims, 10 Drawing Sheets

Related U.S. Application Data continuation of application No. PCT/CN2018/107318, filed on Sep. 25, 2018.

(58) Field of Classification Search
USPC .................................... 235/462.09, 462.25
See application file for complete search history.

(56) References Cited

U.S. PATENT DOCUMENTS

| | | | | |
|---|---|---|---|---|
| 2009/0103803 | A1* | 4/2009 | Kumar | G06K 7/1434 382/166 |
| 2010/0155464 | A1 | 6/2010 | Swayn | |
| 2011/0084142 | A1* | 4/2011 | Cheng | G06K 7/10851 235/462.25 |
| 2011/0085732 | A1 | 4/2011 | Cheng | |
| 2011/0290880 | A1* | 12/2011 | Cai | G06K 7/1473 235/437 |
| 2012/0281009 | A1* | 11/2012 | Ward | H04N 5/2355 345/589 |
| 2013/0201533 | A1* | 8/2013 | Takemoto | G06K 15/027 358/406 |
| 2015/0090788 | A1 | 4/2015 | Zhang et al. | |
| 2015/0090795 | A1 | 4/2015 | Zhang et al. | |
| 2017/0140191 | A1 | 5/2017 | Tanabe | |
| 2019/0156092 | A1* | 5/2019 | Liu | G06T 7/13 |
| 2020/0097693 | A1 | 3/2020 | Tu | |

FOREIGN PATENT DOCUMENTS

| | | |
|---|---|---|
| CN | 104517091 | 4/2015 |
| CN | 104700062 | 6/2015 |
| CN | 104951726 | 9/2015 |
| CN | 105117677 | 12/2015 |
| CN | 105138943 | 12/2015 |
| CN | 105184208 | 12/2015 |
| CN | 105512598 | 4/2016 |
| CN | 106156674 | 11/2016 |
| CN | 106372560 | 2/2017 |
| CN | 106919883 | 7/2017 |
| CN | 107729790 | 2/2018 |
| TW | 201612794 | 4/2016 |

OTHER PUBLICATIONS

Extended European Search Report in European Application No. 18862550.3, dated May 13, 2020, 6 pages.

International Preliminary Report on Patentability in International Application No. PCT/CN2018/107318, dated Mar. 31, 2020, 10 pages.

International Search Report and Written Opinion in International Application No. PCT/CN2018/107318, dated Dec. 28, 2019, 10 pages (with Partial English Translation).

Nakamoto, "Bitcoin: A Peer-to-Peer Electronic Cash System," www.bitcoin.org, 2005, 9 pages.

* cited by examiner

Determine, from row pixels in a QR code image that includes first-type pixels and second-type pixels, first pixel arrangements in which consecutive arrangement ratios of a first-type pixel, a second-type pixel, and a first-type pixel satisfy a first predetermined ratio, and determine, from column pixels in the QR code image that includes the first-type pixels and the second-type pixels, second pixel arrangements in which consecutive arrangement ratios of a first-type pixel, a second-type pixel, and a first-type pixel satisfy a second predetermined ratio — S202

Determine centers of candidate position detection patterns based on centers of the first pixel arrangements and centers of the second pixel arrangements — S204

Identify the corresponding candidate position detection patterns based on the determined centers of the candidate position detection patterns — S206

Determine, from the identified candidate position detection patterns, candidate position detection patterns that satisfy a first selection condition — S208

Determine, from the candidate position detection patterns that satisfy the first selection condition, candidate position detection patterns that satisfy a second selection condition — S210

Determine, from the candidate position detection patterns that satisfy the second selection condition, patterns that satisfy a QR code positioning rule — S212

FIG. 5

QR CODE POSITIONING METHOD AND APPARATUS

CROSS-REFERENCE TO RELATED APPLICATIONS

This application is a continuation of and claims the benefit of priority of U.S. patent application Ser. No. 16/697,833, filed Nov. 27, 2019, which is a continuation of PCT Application No. PCT/CN2018/107318, filed on Sep. 25, 2018, which claims priority to Chinese Patent Application No. 201710888105.9, filed on Sep. 27, 2017, and each application is hereby incorporated by reference in its entirety.

TECHNICAL FIELD

The present application relates to the image processing field, and in particular, to a QR code positioning method and apparatus.

BACKGROUND

A QR code is also referred to as a two-dimensional barcode. The QR code records data symbol information by using a pattern that is formed by arranging a specific type of geometric pattern in a plane (two-dimensional direction) based on a specific rule. Compared with a conventional barcode, the QR code is characterized by high information capacity, strong error correction capability, high decoding reliability, etc., and has advantages like low costs, easy to make, etc. Therefore, the QR code has been widely used in multiple fields, such as the payment field and the identity authentication field.

When a QR code is being used, after the QR code is scanned, the QR code needs to be identified to obtain data symbol information stored in the QR code. After a QR code pattern is scanned, a QR code is positioned and decoded, to identify the QR code. In a related technology, position detection patterns in the QR code image are first identified, and then the QR code is positioned by using the position detection patterns.

In routine use of the QR code, a problem of poor recognition performance often occurs in some environments. For example, when position detection patterns of the QR code are slightly stained or are weak in brightness, the position detection patterns of the QR code often cannot be accurately identified. As a result, the QR code cannot be positioned, and consequently the QR code fails to be identified. Therefore, a QR code positioning method with relatively high accuracy and validity in different environments is urgently needed in the industry.

SUMMARY

An objective of the implementations of the present application is to provide a QR code positioning method and apparatus, to achieve relatively high QR code positioning accuracy and validity, thereby improving QR code recognition efficiency.

To resolve the previous technical problem, the implementations of the present application are implemented in the following way:

An implementation of the present application provides a QR code positioning method, including: determining, from a QR code image that includes first-type pixels and second-type pixels, centers of candidate position detection patterns in the QR code image based on a predetermined row pixel detection rule and a predetermined column pixel detection rule, where the row pixel detection rule includes that a consecutive arrangement ratio of a first-type pixel, a second-type pixel, and a first-type pixel satisfies a first predetermined ratio, and the column pixel detection rule includes that a consecutive arrangement ratio of a first-type pixel, a second-type pixel, and a first-type pixel satisfies a second predetermined ratio; identifying the corresponding candidate position detection patterns based on the determined centers of the candidate position detection patterns; and determining, from the identified candidate position detection patterns, patterns that satisfy a QR code image positioning rule, and using the determined patterns as position detection patterns of the QR code image.

An implementation of the present application further provides a QR code positioning method, including: determining, from a QR code image that includes first-type pixels and second-type pixels, centers of candidate position detection patterns in the QR code image based on a predetermined row pixel detection rule and a predetermined column pixel detection rule, where the row pixel detection rule includes that a quantity of consecutively arranged first-type pixels or a quantity of consecutively arranged second-type pixels reaches a first predetermined threshold, and the column pixel detection rule includes that a quantity of consecutively arranged first-type pixels or a quantity of consecutively arranged second-type pixels reaches a second predetermined threshold; identifying the corresponding candidate position detection patterns based on the determined centers of the candidate position detection patterns; and determining, from the identified candidate position detection patterns, patterns that satisfy a QR code image positioning rule, and using the determined patterns as position detection patterns of the QR code image.

An implementation of the present application further provides a QR code positioning method, including: determining, from a QR code image that includes first-type pixels and second-type pixels, centers of candidate position detection patterns in the QR code image based on a predetermined pixel detection rule, where the pixel detection rule includes that a consecutive arrangement ratio of a first-type pixel, a second-type pixel, and a first-type pixel satisfies a predetermined ratio identifying the corresponding candidate position detection patterns based on the determined centers of the candidate position detection patterns; and determining, from the identified candidate position detection patterns, patterns that satisfy a QR code image positioning rule, and using the determined patterns as position detection patterns of the QR code image.

An implementation of the present application further provides a QR code positioning apparatus, including: a position determining module, configured to determine, from a QR code image that includes first-type pixels and second-type pixels, centers of candidate position detection patterns in the QR code image based on a predetermined row pixel detection rule and a predetermined column pixel detection rule, where the row pixel detection rule includes that a consecutive arrangement ratio of a first-type pixel, a second-type pixel, and a first-type pixel satisfies a first predetermined ratio, and the column pixel detection rule includes that a consecutive arrangement ratio of a first-type pixel, a second-type pixel, and a first-type pixel satisfies a second predetermined ratio; an identification module, configured to identify the corresponding candidate position detection patterns based on the determined centers of the candidate position detection patterns; and a pattern determining module, configured to determine, from the identified candidate position detection patterns, patterns that satisfy a QR code image positioning rule, and use the determined patterns as position detection patterns of the QR code image.

An implementation of the present application further provides a QR code positioning apparatus, including: a position determining module, configured to determine, from a QR code image that includes first-type pixels and second-type pixels, centers of candidate position detection patterns in the QR code image based on a predetermined row pixel detection rule and a predetermined column pixel detection rule, where the row pixel detection rule includes that a quantity of consecutively arranged first-type pixels or a quantity of consecutively arranged second-type pixels reaches a first predetermined threshold, and the column pixel detection rule includes that a quantity of consecutively arranged first-type pixels or a quantity of consecutively arranged second-type pixels reaches a second predetermined threshold; an identification module, configured to identify the corresponding candidate position detection patterns based on the determined centers of the candidate position detection patterns; and a pattern determining module, configured to determine, from the identified candidate position detection patterns, patterns that satisfy a QR code image positioning rule, and use the determined patterns as position detection patterns of the QR code image.

An implementation of the present application further provides a QR code positioning apparatus, including: a position determining module, configured to determine, from a QR code image that includes first-type pixels and second-type pixels, centers of candidate position detection patterns in the QR code image based on a predetermined pixel detection rule, where the pixel detection rule includes that a consecutive arrangement ratio of a first-type pixel, a second-type pixel, and a first-type pixel satisfies a predetermined ratio; an identification module, configured to identify the corresponding candidate position detection patterns based on the determined centers of the candidate position detection patterns; and a pattern determining module, configured to determine, from the identified candidate position detection patterns, patterns that satisfy a QR code image positioning rule, and use the determined patterns as position detection patterns of the QR code image.

An implementation of the present application further provides a QR code positioning device, including: a processor; and a memory arranged to store computer executable instructions, where when the executable instructions are being executed, the processor is enabled to: determine, from a QR code image that includes first-type pixels and second-type pixels, centers of candidate position detection patterns in the QR code image based on a predetermined row pixel detection rule and a predetermined column pixel detection rule, where the row pixel detection rule includes that a consecutive arrangement ratio of a first-type pixel, a second-type pixel, and a first-type pixel satisfies a first predetermined ratio, and the column pixel detection rule includes that a consecutive arrangement ratio of a first-type pixel, a second-type pixel, and a first-type pixel satisfies a second predetermined ratio; identify the corresponding candidate position detection patterns based on the determined centers of the candidate position detection patterns; and determine, from the identified candidate position detection patterns, patterns that satisfy a QR code image positioning rule, and use the determined patterns as position detection patterns of the QR code image.

An implementation of the present application further provides a QR code positioning device, including: a processor; and a memory arranged to store computer executable instructions, where when the executable instructions are being executed, the processor is enabled to: determine, from a QR code image that includes first-type pixels and second-type pixels, centers of candidate position detection patterns in the QR code image based on a predetermined row pixel detection rule and a predetermined column pixel detection rule, where the row pixel detection rule includes that a quantity of consecutively arranged first-type pixels or a quantity of consecutively arranged second-type pixels reaches a first predetermined threshold, and the column pixel detection rule includes that a quantity of consecutively arranged first-type pixels or a quantity of consecutively arranged second-type pixels reaches a second predetermined threshold; identify the corresponding candidate position detection patterns based on the determined centers of the candidate position detection patterns; and determine, from the identified candidate position detection patterns, patterns that satisfy a QR code image positioning rule, and use the determined patterns as position detection patterns of the QR code image.

An implementation of the present application further provides a QR code positioning device, including: a processor; and a memory arranged to store computer executable instructions, where when the executable instructions are being executed, the processor is enabled to: determine, from a QR code image that includes first-type pixels and second-type pixels, centers of candidate position detection patterns in the QR code image based on a predetermined pixel detection rule, where the pixel detection rule includes that a consecutive arrangement ratio of a first-type pixel, a second-type pixel, and a first-type pixel satisfies a predetermined ratio; identify the corresponding candidate position detection patterns based on the determined centers of the candidate position detection patterns; and determine, from the identified candidate position detection patterns, patterns that satisfy a QR code image positioning rule, and use the determined patterns as position detection patterns of the QR code image.

An implementation of the present application further provides a storage medium, configured to store computer executable instructions, where when the executable instructions are being executed, the following procedures are implemented: determining, from a QR code image that includes first-type pixels and second-type pixels, centers of candidate position detection patterns in the QR code image based on a predetermined row pixel detection rule and a predetermined column pixel detection rule, where the row pixel detection rule includes that a consecutive arrangement ratio of a first-type pixel, a second-type pixel, and a first-type pixel satisfies a first predetermined ratio, and the column pixel detection rule includes that a consecutive arrangement ratio of a first-type pixel, a second-type pixel, and a first-type pixel satisfies a second predetermined ratio; identifying the corresponding candidate position detection patterns based on the determined centers of the candidate position detection patterns; and determining, from the identified candidate position detection patterns, patterns that satisfy a QR code image positioning rule, and using the determined patterns as position detection patterns of the QR code image.

An implementation of the present application further provides a storage medium, configured to store computer executable instructions, where when the executable instructions are being executed, the following procedures are implemented: determining, from a QR code image that includes first-type pixels and second-type pixels, centers of candidate position detection patterns in the QR code image based on a predetermined row pixel detection rule and a predetermined column pixel detection rule, where the row pixel detection rule includes that a quantity of consecutively arranged first-type pixels or a quantity of consecutively arranged second-type pixels reaches a first predetermined threshold, and the column pixel detection rule includes that a quantity of consecutively arranged first-type pixels or a quantity of consecutively arranged second-type pixels reaches a second predetermined threshold; identifying the corresponding candidate position detection patterns based on the determined centers of the candidate position detection patterns; and determining, from the identified candidate position detection patterns, patterns that satisfy a QR code image positioning rule, and using the determined patterns as position detection patterns of the QR code image.

An implementation of the present application further provides a storage medium, configured to store computer executable instructions, where when the executable instructions are being executed, the following procedures are implemented: determining, from a QR code image that includes first-type pixels and second-type pixels, centers of candidate position detection patterns in the QR code image based on a predetermined pixel detection rule, where the pixel detection rule includes that a consecutive arrangement ratio of a first-type pixel, a second-type pixel, and a first-type pixel satisfies a predetermined ratio; identifying the corresponding candidate position detection patterns based on the determined centers of the candidate position detection patterns; and determining, from the identified candidate position detection patterns, patterns that satisfy a QR code image positioning rule, and using the determined patterns as position detection patterns of the QR code image.

According to the QR code positioning method and apparatus in the implementations of the present application, the centers of the candidate position detection patterns in the QR code image are determined based on the arrangement ratio of a first-type pixel, a second-type pixel, and a first-type pixel or based on the quantity of consecutively arranged first-type pixels or the quantity of consecutively arranged second-type pixels, which has certain fault tolerance. As such, the candidate position detection patterns can be identified even if the position detection patterns of the QR code are stained or are weak in brightness, thereby improving identification validity of the candidate position detection patterns. In addition, after the candidate position detection patterns are identified by using the previous method, the position detection patterns of the QR code are determined from the identified candidate position detection patterns, so that accuracy is relatively high.

BRIEF DESCRIPTION OF DRAWINGS

To describe the technical solutions in the implementations of the present application or in the existing technology more clearly, the following briefly describes the accompanying drawings required for describing the implementations or the existing technology. Apparently, the accompanying drawings in the following description merely show some implementations of the present application, and a person of ordinary skill in the art can still derive other drawings from these accompanying drawings without creative efforts.

FIG. 5 is a second schematic flowchart illustrating a QR code positioning method, according to an implementation of the present application;

DESCRIPTION OF IMPLEMENTATIONS

To make a person skilled in the art understand the technical solutions in the present application better, the following clearly describes the technical solutions in the implementations of the present application with reference to the accompanying drawings in the implementations of the present application. Apparently, the described implementations are merely some but not all of the implementations of the present application. All other implementations obtained by a person of ordinary skill in the art based on the implementations of the present application without creative efforts shall fall within the protection scope of the present application.

The implementations of the present application provide a QR code positioning method and apparatus, and the method can be applied to a scenario in which a QR code is used for payment, identity authentication, etc. The QR code can be a QR code used by any application programs, such as ALIPAY or WeChat.

Generally, when a QR code is applied, the QR code needs to be identified to obtain information stored in the QR code. The QR code identification includes at least QR code positioning and QR code decoding. That is, the QR code positioning is one step of the QR code identification.

The method provided in the implementations of the present application can be executed by a terminal, for example, a mobile phone, a computer, a tablet computer, or a QR code scanning device. In this case, after the terminal obtains a QR code image, the terminal directly executes the method provided in the implementations of the present application on the obtained QR code image. Certainly, the method provided in the implementations of the present application can be executed by a server. In this case, first, a terminal obtains a QR code image through scanning; and then, the server obtains the QR code image from the terminal, and the server executes the method provided in the implementations of the present application on the obtained QR code image.

Figure 1:
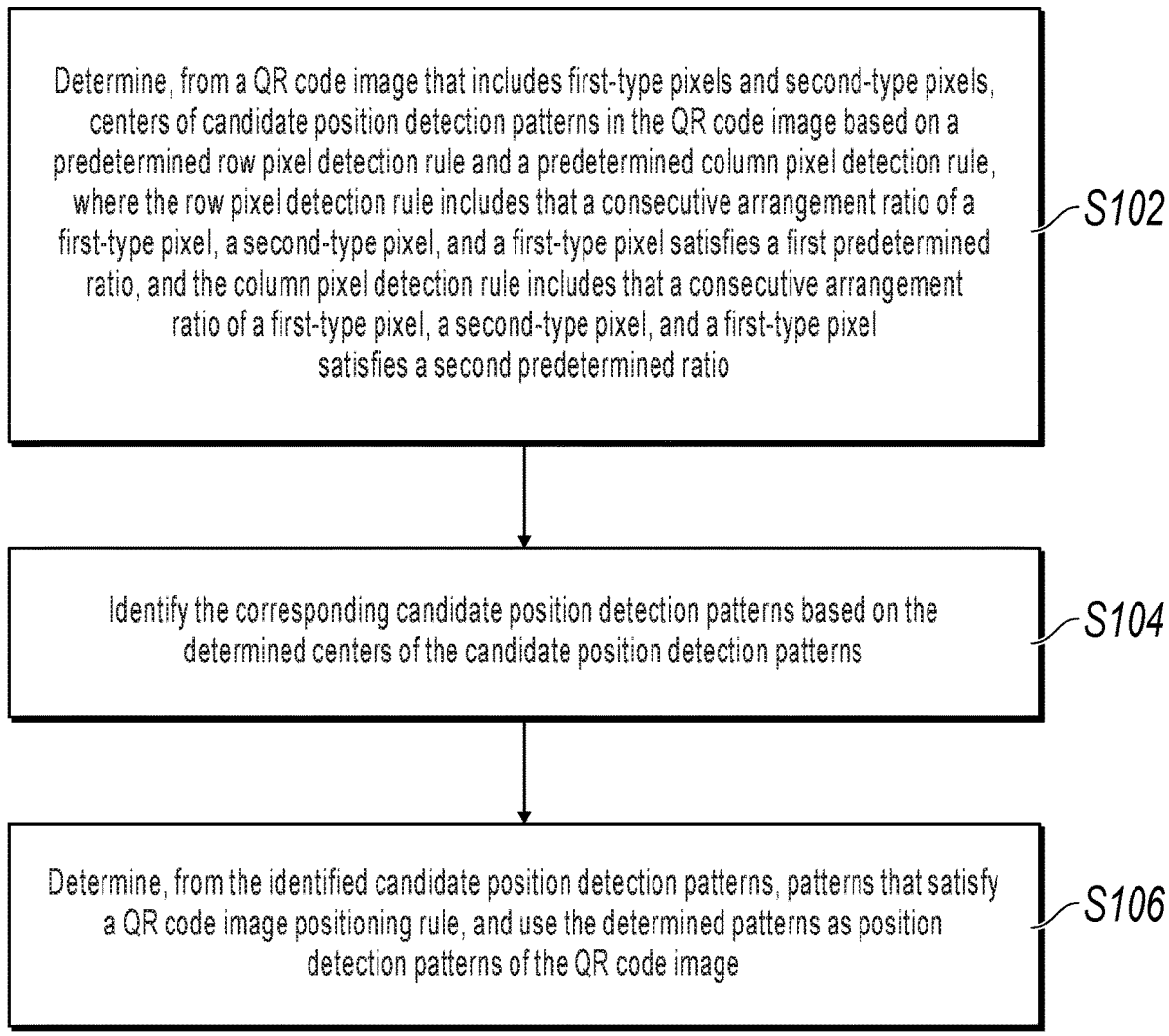
FIG. 1 is a first schematic flowchart illustrating a QR code positioning method, according to an implementation of the present application.

FIG. 1 is a first schematic flowchart illustrating a QR code positioning method, according to an implementation of the present application. As shown in FIG. 1, the method includes at least the following steps.

Step S102: Determine, from a QR code image that includes first-type pixels and second-type pixels, centers of candidate position detection patterns in the QR code image based on a predetermined row pixel detection rule and a predetermined column pixel detection rule, where the row pixel detection rule includes that a consecutive arrangement ratio of a first-type pixel, a second-type pixel, and a first-type pixel satisfies a first predetermined ratio, and the column pixel detection rule includes that a consecutive arrangement ratio of a first-type pixel, a second-type pixel, and a first-type pixel satisfies a second predetermined ratio.

The first-type pixel and the second-type pixel are pixels of different colors. For example, when the QR code is a black-and-white QR code, the first-type pixel can be a black pixel, and the second-type pixel can be a white pixel. When the QR code is a blue-and-white QR code, the first-type pixel can be a blue pixel, and the second-type pixel can be a white pixel.

In addition, in a specific implementation, to facilitate subsequent processing, after an original QR code image is obtained, binarization processing is performed on the original QR code image to obtain a binarized image of the QR code image. In this case, pixels in the QR code image are in only two colors: black and white. Therefore, the first-type pixel can be a black pixel, and the second-type pixel can be a white pixel.

Figure 2:
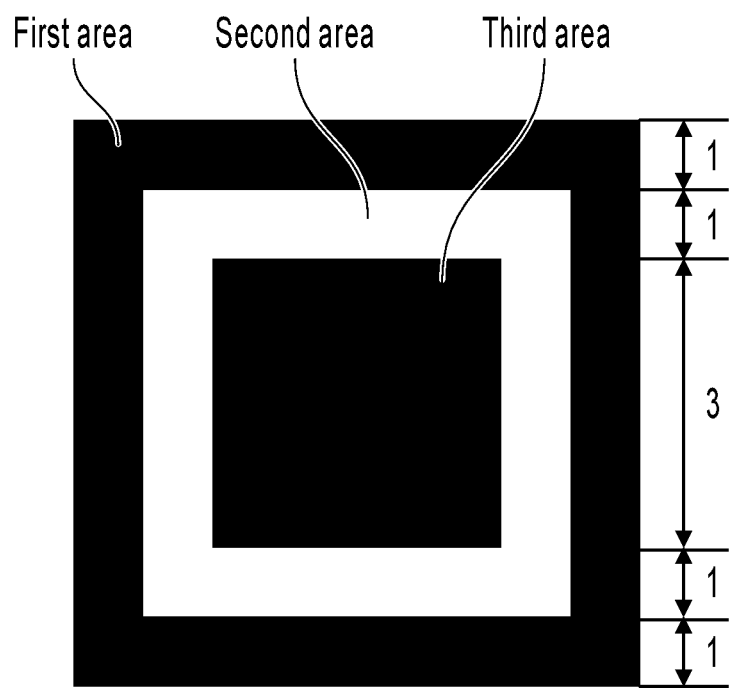
FIG. 2 is a schematic diagram illustrating a position detection pattern of a QR code, according to an implementation of the present application.

Generally, three position detection patterns are set in each QR code, and the three position detection patterns are located at any three of four corners of the QR code. The position detection pattern is generally a rectangular pattern, and can be a square with four equal sides, or can be a rectangle. It can be considered that each position detection pattern includes three concentric rectangles. FIG. 2 is a possible schematic diagram illustrating a position detection pattern of a QR code, according to an implementation of the present application. The position detection pattern in FIG. 2 includes three concentric squares. The three squares are a 7×7 black module, a 5×5 white module, and a 3×3 black module. That is, a first-type pixel is a black pixel, a second-type pixel is a white pixel, and a modular width ratio of the position detection pattern is 1:1:3:1:1. In FIG. 2, the outermost black rectangular area of the position detection pattern is denoted as a first area, the middle black rectangular area of the position detection pattern is denoted as a third area, and a white area between the first area and the second area is denoted as a second area.

The first predetermined ratio is 1:n:1, and n is greater than 1. The second predetermined ratio is 1:m:1, and m is greater than 1. Values of m and n can be the same or can be different, and specific values of m and n can be determined based on an actual application scenario. For example, for the existing 1:1:3:1:1 position detection pattern, both values of m and n can be 5, that is, the first predetermined ratio can be 1:5:1, and the second predetermined ratio can be 1:5:1.

In this implementation of the present application, the determining centers of candidate position detection patterns in the QR code image includes the following steps ($a_1$) and ($a_2$): ($a_1$) determining, from row pixels, first pixel arrangements in which consecutive arrangement ratios of a first-type pixel, a second-type pixel, and a first-type pixel satisfy the first predetermined ratio; and determining, from column pixels, second pixel arrangements in which consecutive arrangement ratios of a first-type pixel, a second-type pixel, and a first-type pixel satisfy the second predetermined ratio; and ($a_2$) determining the centers of the candidate position detection patterns based on centers of the first pixel arrangements and centers of the second pixel arrangements.

The consecutive arrangement ratio of the first-type pixel, the second-type pixel, and the first-type pixel satisfies a first predetermined ratio refers to: first-type pixel:second-type pixel:first-type pixel=1:n:1. The consecutive arrangement ratio of the first-type pixel, the second-type pixel, and the first-type pixel satisfies a second predetermined ratio refers to: first-type pixel:second-type pixel:first-type pixel=1:m:1. Specifically, the pixel arrangement ratio here can be a pixel quantity arrangement ratio.

In this implementation of the present application, the first pixel arrangement that satisfies the first predetermined ratio is a row of pixels that passes through only the first area and the second area in FIG. 2, and the second pixel arrangement that satisfies the second predetermined ratio is a column of pixels that passes through only the first area and the second area in FIG. 2.

In practice, because the scanned QR code image may be deformed, incomplete, stained, etc., the consecutive arrangement ratio of a first-type pixel, a second-type pixel, and a first-type pixel in the first pixel arrangement in the position detection pattern in the QR code image cannot strictly satisfy the first predetermined ratio, and the consecutive arrangement ratio of a first-type pixel, a second-type pixel, and a first-type pixel in the second pixel arrangement in the position detection pattern in the QR code image cannot strictly satisfy the second predetermined ratio. Therefore, in step ($a_1$), provided that a consecutive arrangement ratio of a first-type pixel, a second-type pixel, and a first-type pixel falls within an error range of the first predetermined ratio or the second predetermined ratio, it can be considered that the consecutive arrangement ratio of a first-type pixel, a second-type pixel, and a first-type pixel satisfies the first predetermined ratio or the second predetermined ratio.

In step ($a_2$), coordinates of the centers of the candidate position detection patterns can be determined based on the centers of the first pixel arrangements and the centers of the second pixel arrangements, and then the centers of the candidate position detection pattern can be determined.

Figure 3:
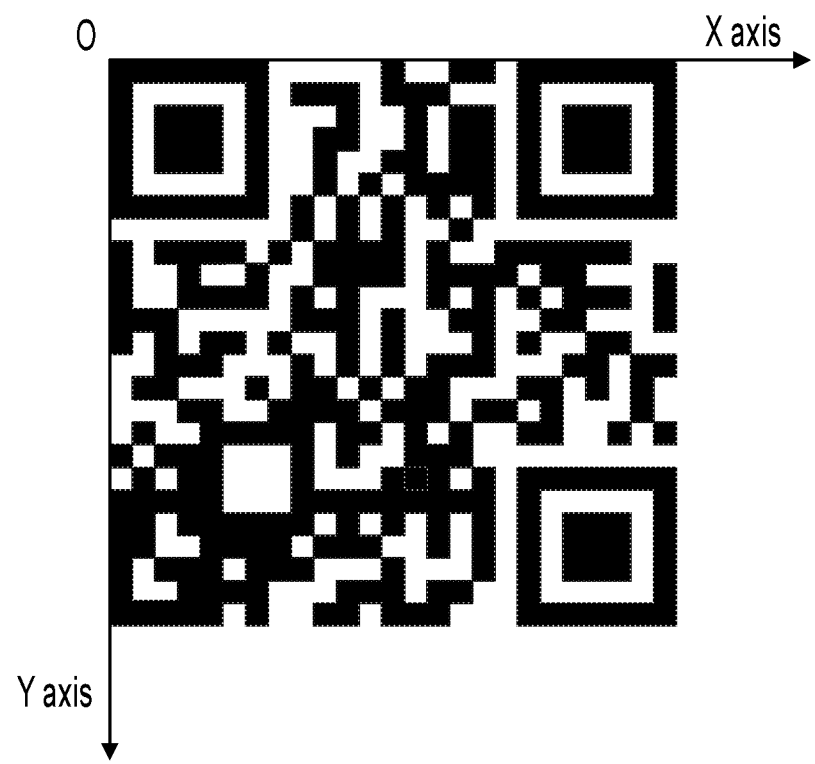
FIG. 3 is a schematic diagram illustrating a coordinate system established on a QR code, according to an implementation of the present application.
Figure 4:
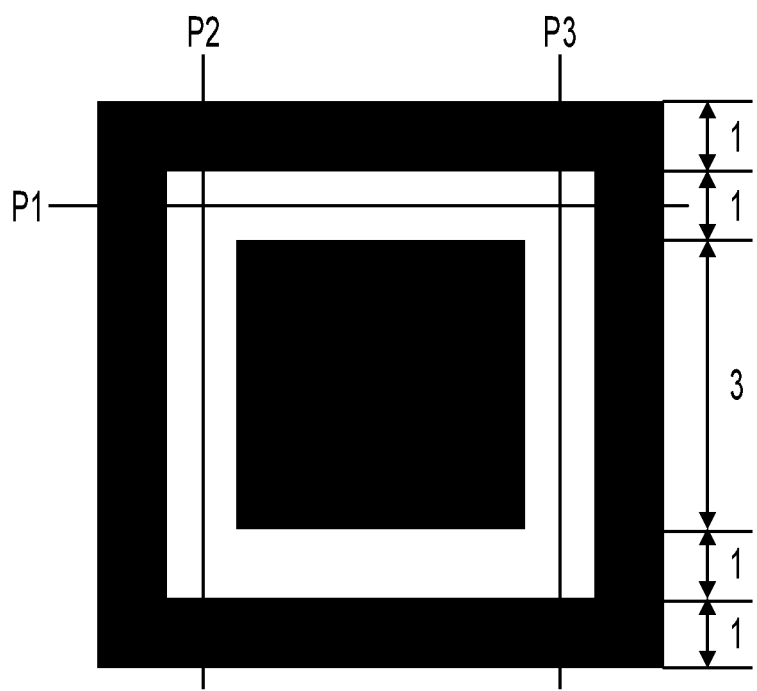
FIG. 4 is a schematic diagram illustrating a first pixel arrangement and a second pixel arrangement that are determined on a position detection pattern of a QR code, according to an implementation of the present application.

In a specific implementation, the upper left corner of the QR code is used as a coordinate origin O, a horizontal line that passes through the coordinate origin is used as a horizontal axis (X axis), and a vertical line that passes through the coordinate origin is used as a vertical axis (Y axis), to establish an OXY coordinate system, as shown in FIG. 3. Specifically, the coordinates of the centers of the candidate position detection patterns can be determined by using at least the following three methods ($b_1$), ($b_2$), and ($b_3$):

(b1) A scanning line is drawn in the X direction in the QR code image, the QR code image is scanned in the Y direction by using the scanning line, and a first pixel arrangement is determined at a first predetermined position in each candidate position detection pattern. Then, a scanning line is drawn in the Y direction in the QR code image, the QR code image is scanned in the X direction by using the scanning line, and second pixel arrangements are separately determined at a second predetermined position and a third predetermined position in each candidate position detection pattern. As shown in FIG. 4, the first pixel arrangement at the first predetermined position is denoted as $P_1$, a second pixel arrangement at the second predetermined position is denoted as $P_2$, and a second pixel arrangement at the third predetermined position is denoted as $P_3$. A distance from the second pixel arrangement $P_2$ to the left edge of the candidate position detection pattern is denoted as a first distance, and distance from the second pixel arrangement $P_3$ to the right edge of the candidate position detection pattern is denoted as a second distance. In a specific implementation, for ease of calculation, positions of the second pixel arrangement $P_2$ and the second pixel arrangement $P_3$ are enabled to exactly satisfy a condition that the first distance is equal to the second distance. An average value of positions of the second pixel arrangement $P_2$ and the second pixel arrangement $P_3$ in a horizontal direction is calculated, where the average value is a center of the first pixel arrangement $P_1$, and a horizontal coordinate of the center is denoted as a horizontal coordinate of a center of the candidate position detection pattern.

In addition, in this implementation of the present application, the position detection pattern in the QR code is evenly divided into multiple rectangular modules. The rectangular module can be a square module. A length-to-width ratio of the rectangular module can be set based on an actual application scenario.

A width of each rectangular module can be calculated by calculating a ratio of a width of the candidate position detection pattern and a quantity of rectangular modules in the width direction. Then, a center of the second pixel arrangement is determined based on a position of the first pixel arrangement $P_1$ in the vertical direction and a quantity of rectangular modules between the first pixel arrangement $P_1$ and the center in the vertical direction, and a vertical coordinate of the center of the second pixel arrangement is a vertical coordinate of the center of the candidate position detection pattern.

The first predetermined position can be any position that enables the first pixel arrangement to satisfy the first predetermined ratio, and the second predetermined position and the third predetermined position can also be any position that enables the second pixel arrangement satisfies the second predetermined ratio. In some implementations, for ease of calculation, the first predetermined position, the second predetermined position, and the third predetermined position can be all set at an entire rectangular module.

($b_2$) In this case, a method for determining the horizontal coordinate of the center of the candidate position detection pattern is the same as the method for determining the horizontal coordinate in ($b_1$), and details are omitted here.

In addition, in this case, the vertical coordinate of the center of the candidate position detection pattern is determined by using a method the same as the method for determining the horizontal coordinate. A specific process is as follows: A scanning line is drawn in the X direction in the QR code image, the QR code image is scanned in the Y direction by using the scanning line, a first pixel distribution $P_1$ is determined at a first predetermined position, and a first pixel arrangement $P_4$ is determined at a fourth predetermined position. The vertical coordinate of the center of the candidate position detection pattern is determined based on the first pixel arrangement $P_1$ and the first pixel arrangement $P_4$. A specific process is similar to the previous process of determining the horizontal coordinate, and details are omitted here.

($b_3$) A scanning line is drawn in the X direction in the QR code image, the QR code image is scanned in the Y direction by using the scanning line, and a first pixel arrangement $P_1$ is determined at a first predetermined position. A scanning line is drawn in the Y direction in the QR code image, the QR code image is scanned in the X direction by using the scanning line, and a second pixel arrangement $P_2$ is determined at a second predetermined position. A center of the first pixel arrangement $P_1$ is determined based on distance between the first pixel and the last pixel of the first pixel arrangement $P_1$, and a center of the second pixel arrangement $P_2$ is determined by using the same method. The horizontal coordinate of the center of the candidate position detection pattern is determined based on the center of the first pixel arrangement $P_1$, and the vertical coordinate of the center of the candidate position detection pattern is determined based on the center of the second pixel arrangement $P_2$.

In this implementation of the present application, the first pixel arrangement is a row of pixels in the candidate position detection pattern, and the second pixel arrangement is a column of pixels in the candidate position detection pattern.

In this implementation of the present application, the centers of the candidate position detection patterns in the QR code image are determined based on only the consecutive arrangement ratio of a first-type pixel, a second-type pixel, and a first-type pixel, so that QR code recognition validity is improved.

Step S104: Identify the corresponding candidate position detection patterns based on the determined centers of the candidate position detection patterns.

In this implementation of the present application, after the centers of the candidate position detection patterns are determined, patterns that the centers are located in are determined as the candidate position detection patterns of the QR code.

Step S106: Determine, from the identified candidate position detection patterns, patterns that satisfy a QR code image positioning rule, and use the determined patterns as position detection patterns of the QR code image.

In this implementation of the present application, the candidate position detection patterns in the QR code image can be identified by using step S102 and step S104. However, another pattern may exist in the candidate position detection patterns that are identified by using only the two steps. Therefore, to improve position detection pattern recognition accuracy, further selection needs to be performed on the identified candidate position detection patterns, and the patterns that satisfy the QR code image positioning rule are determined from selected candidate position detection patterns, which is specifically implemented by using the following steps (1) and (2): (1) determining, from the identified candidate position detection patterns, candidate position detection patterns that satisfy at least one of a first selection condition and a second selection condition, where the first selection condition includes that at least one of a quantity of first-type pixels and a quantity of second-type pixels within a predetermined area adjacent to the center satisfies a predetermined threshold range, and the second selection condition includes that a consecutive arrangement ratio of a first-type pixel, a second-type pixel, a first-type pixel, a second-type pixel, and a first-type pixel in a third pixel arrangement that passes through the center satisfies a third predetermined ratio; and (2) determining, from the candidate position detection patterns that satisfy at least one of the first selection condition and the second selection condition, the patterns that satisfy the QR code positioning rule.

Specifically, the determining, from the identified candidate position detection patterns, patterns that satisfy a QR code image positioning rule includes the following three cases:

Case 1: determining, from the identified candidate position detection patterns, candidate position detection patterns that satisfy the first selection condition, and determining, from the candidate position detection patterns that satisfy the first selection condition, the patterns that satisfy the QR code positioning rule.

Case 2: determining, from the identified candidate position detection patterns, candidate position detection patterns that satisfy the second selection condition, and determining, from the candidate position detection patterns that satisfy the second selection condition, the patterns that satisfy the QR code positioning rule.

Case 3: determining, from the identified candidate position detection patterns, candidate position detection patterns that satisfy the first selection condition and the second selection condition, and determining, from the candidate position detection patterns that satisfy the first selection condition and the second selection condition, the patterns that satisfy the QR code positioning rule.

In case 3, a specific implementation can be: first determining, from the identified candidate position detection patterns, candidate position detection patterns that satisfy the first selection condition, and then selecting, from the candidate position detection patterns that satisfy the first selection condition, candidate position detection patterns that satisfy the second selection condition; and determining, from the candidate position detection patterns that satisfy the second selection condition, the patterns that satisfy the QR code positioning rule.

Certainly, candidate position detection patterns that satisfy the second selection condition can be first selected, and then candidate position detection patterns that satisfy the first selection condition can be selected from the candidate position detection patterns that satisfy the second selection condition.

Specifically, in this implementation of the present application, a process of using the first selection condition for selection is as follows: A pixel at the center of the candidate position detection pattern is used as a center to select a predetermined quantity of pixels around the pixel at the center. For example, nine pixels or five pixels including the pixel at the center are selected. Then, a quantity of first-type pixels and a quantity of second-type pixels in the selected predetermined quantity of pixels are determined, and selection is performed based on the quantity of first-type pixels and the quantity of second-type pixels. For example, if a third area that the center is located in is a black pixel area, the first-type pixel is a black pixel, and the second-type pixel is a white pixel. In a normal case, all pixels in the third area are first-type pixels, or there might be several white pixels in the third area due to impact of salt and pepper noise. Therefore, the quantity of second-type pixels in the selected predetermined quantity of pixels is determined, and when a ratio of the quantity of second-type pixels and the predetermined quantity is greater than a predetermined ratio, the candidate position detection pattern is not selected.

Specifically, the third pixel arrangement can be any pixel arrangement including the pixel at the center. For example, the third pixel arrangement can be a diagonal of the candidate position detection pattern; or can be an oblique line that includes the pixel at the center, where a value of an angle between the oblique line and a horizontal line is 30°.

In a 1:1:3:1:1 position detection pattern, the third predetermined ratio is 1:1:3:1:1.

FIG. 5 is a second schematic flowchart illustrating a QR code positioning method, according to an implementation of the present application. As shown in FIG. 5, the method includes the following steps:

Step S202: Determine, from row pixels in a QR code image that includes first-type pixels and second-type pixels, first pixel arrangements in which consecutive arrangement ratios of a first-type pixel, a second-type pixel, and a first-type pixel satisfy a first predetermined ratio, and determine, from column pixels in the QR code image that includes the first-type pixels and the second-type pixels, second pixel arrangements in which consecutive arrangement ratios of a first-type pixel, a second-type pixel, and a first-type pixel satisfy a second predetermined ratio.

Step S204: Determine centers of candidate position detection patterns based on centers of the first pixel arrangements and centers of the second pixel arrangements.

Step S206: Identify the corresponding candidate position detection patterns based on the determined centers of the candidate position detection patterns.

Step S208: Determine, from the identified candidate position detection patterns, candidate position detection patterns that satisfy a first selection condition.

Step S210: Determine, from the candidate position detection patterns that satisfy the first selection condition, candidate position detection patterns that satisfy a second selection condition.

Step S212: Determine, from the candidate position detection patterns that satisfy the second selection condition, patterns that satisfy a QR code positioning rule.

Three position detection patterns in the QR code are located at any three of four corners of the QR code. Therefore, the positioning rule can include that the shortest two lines among the three lines that connect centers of the three position detection patterns are perpendicular with each other and are equal in length.

The center of the position detection pattern is a center of the position detection pattern.

Therefore, determining, from candidate position detection patterns that satisfy at least one of the first selection condition and the second selection condition, the patterns that satisfy the QR code positioning rule includes: forming, from the candidate position detection patterns that satisfy at least one of the first selection condition and the second selection condition, multiple groups of candidate position detection patterns by using each three candidate position detection patterns as one group; determining whether each group of candidate position detection patterns satisfies the previous positioning rule; and using at least one group of candidate position detection patterns that satisfy the positioning rule as the position detection patterns of the QR code image.

At least three candidate position detection patterns that satisfy at least one of the first selection condition and the second selection condition are selected. In this implementation of the present application, a quantity of selected candidate position detection patterns that satisfy at least one of the first selection condition and the second selection condition is denoted as N, and $S=C_N^3$ groups of candidate position detection patterns can be formed from the N candidate position detection patterns by using each three candidate position detection patterns as one group. For example, four candidate position detection patterns that satisfy at least one of the first selection condition and the second selection condition are selected and denoted as $A_1, A_2, A_3,$ and $A_4$, and $S=C_4^3=4$ groups of candidate position detection patterns can be formed by using each three candidate position detection patterns as one group and denoted as $\{A_1, A_2, A_3\}, \{A_1, A_3, A_4\}, \{A_1, A_2, A_4\},$ and $\{A_2, A_3, A_4\}$.

Specifically, connection lines of centers of each group of candidate position detection patterns can form a triangle. When determining whether each group of candidate position detection patterns satisfies the positioning rule, it can be determined whether a value of an angle between two short sides in the triangle is 90° and whether the two short sides are equal. Because the obtained QR code image may be deformed, etc., a value of an angle between two short sides in a triangle formed by centers of three position detection patterns is not necessarily 90°. Therefore, in practice, when determining whether each group of candidate position detection patterns satisfies the positioning rule, if a difference between 90° and a value of an angle between two short sides in a triangle formed by centers of each group of candidate position detection patterns falls within a predetermined range and if a length difference between the two short sides falls within a predetermined error range, it is determined that the group of candidate position detection patterns satisfies the positioning rule.

In addition to the previous method for determining the patterns that satisfy the QR code positioning rule, this implementation of the present application further provides the following method, specifically including: forming, from the candidate position detection patterns that satisfy at least one of the first selection condition and the second selection condition, multiple groups of candidate position detection patterns by using each three candidate position detection patterns as one group; determining geometric parameters of a triangle formed by connection lines of centers of three candidate position detection patterns in each group of candidate position detection patterns and a standard deviation of areas of the three candidate position detection patterns, where the geometric parameters include a value of an angle between two short connection lines in the triangle and a length difference between the two short connection lines; and determining, based on the value of the angle, the length difference, and the standard deviation, the patterns that satisfy the QR code positioning rule.

A specific process of determining the standard deviation of the areas of the three candidate position detection patterns is as follows: A length and a width of each module are determined based on a length and a width of each candidate position detection pattern and a quantity of modules in each candidate position detection pattern, and an area of each module is calculated. Then, an area of each candidate position detection pattern is calculated based on the area of each module and the quantity of modules. Finally, the standard deviation of the areas of the three candidate position detection patterns is calculated based on the areas of the three candidate position detection patterns and a standard deviation equation.

Specifically, in this implementation of the present application, the determining, based on the value of the angle, the length difference, and the standard deviation, the patterns that satisfy the QR code positioning rule specifically includes the following steps: calculating a score of each group of candidate position detection patterns based on the value of the angle, the length difference, and the standard deviation by using equation (1); and comparing the score of each group of candidate position detection patterns with a predetermined score, and determining, based on a comparison result, the patterns that satisfy the QR code positioning rule, where $$f_i = \frac{1}{1 + e^{ax_i + by_i + cz_i + d}}. \quad (1)$$

In equation (1), a, b, c, and d are all constants, $x_i$ represents a value of an angle between two short connection lines in a triangle formed by connection lines of centers of an ith group of candidate position detection patterns, $y_i$ represents a length difference between the two short connection lines in the triangle formed by the connection lines of the centers of the ith group of candidate position detection patterns, $z_i$ represents a standard deviation of areas of three candidate position detection patterns in the ith group of candidate position detection patterns, and $f_i$ represents a score of the ith group of candidate position detection patterns.

After the score of each group of candidate position detection patterns is determined, the score is compared with the predetermined score. In a specific implementation, when the score is greater than or equal to the predetermined score, it is determined that the group of candidate position detection patterns satisfies the QR code positioning rule.

In this implementation of the present application, one or more groups of position detection patterns that satisfy the QR code positioning rule can be determined.

Figure 6:
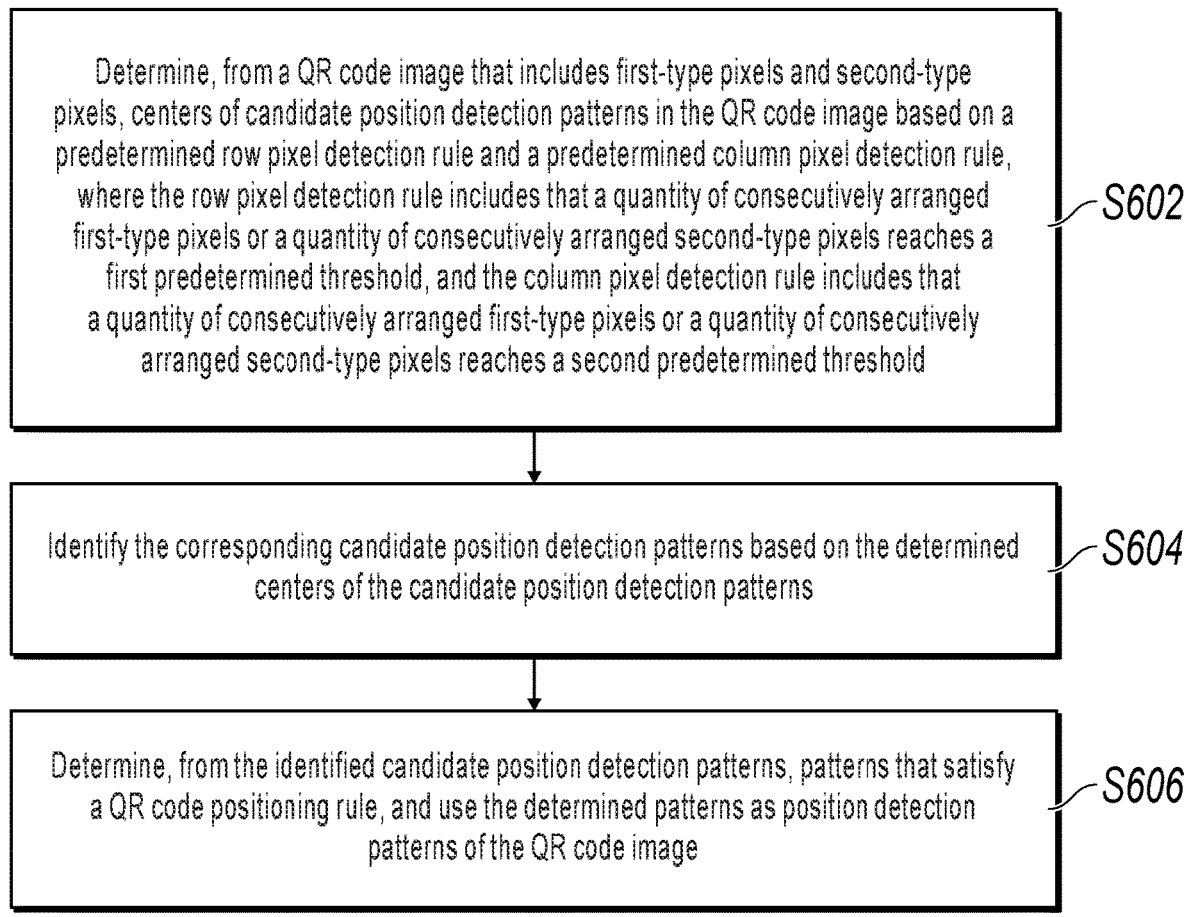
FIG. 6 is a third schematic flowchart illustrating a QR code positioning method, according to an implementation of the present application.

Based on the methods in FIG. 1 to FIG. 5, an implementation of the present application further provides a QR code positioning method. FIG. 6 is a third schematic flowchart illustrating a QR code positioning method, according to an implementation of the present application. The method can be executed by a terminal or a server. For the method shown in FIG. 6, a difference from the methods in FIG. 1 to FIG. 5 is mainly described here. For the same parts, references can be made to the previous descriptions in FIG. 1 to FIG. 5, and details are omitted here. As shown in FIG. 6, the method includes the following steps.

Step S602: Determine, from a QR code image that includes first-type pixels and second-type pixels, centers of candidate position detection patterns in the QR code image based on a predetermined row pixel detection rule and a predetermined column pixel detection rule, where the row pixel detection rule includes that a quantity of consecutively arranged first-type pixels or a quantity of consecutively arranged second-type pixels reaches a first predetermined threshold, and the column pixel detection rule includes that a quantity of consecutively arranged first-type pixels or a quantity of consecutively arranged second-type pixels reaches a second predetermined threshold.

Specifically, the row pixel detection rule can be that the quantity of consecutively arranged first-type pixels reaches the first predetermined threshold, and correspondingly, the column pixel detection rule can be that the quantity of consecutively arranged first-type pixels reaches the second predetermined threshold. Alternatively, the row pixel detection rule can be that the quantity of consecutively arranged second-type pixels reaches the first predetermined threshold, and correspondingly, the column pixel detection rule can be that the quantity of consecutively arranged second-type pixels reaches the second predetermined threshold.

The first predetermined threshold can be equal to the second predetermined threshold. In a specific application scenario, a position detection pattern in a QR code used by ALIPAY is a square, that is, the length of the position detection pattern is equal to the width of the position detection pattern. In this case, the first predetermined threshold is equal to the second predetermined threshold.

Pixel arrangements that satisfy the row pixel detection rule and the column pixel detection rule are generally located in a first area of a binary detection pattern (as shown in FIG. 2).

Step S604: Identify the corresponding candidate position detection patterns based on the determined centers of the candidate position detection patterns.

Step S606: Determine, from the identified candidate position detection patterns, patterns that satisfy a QR code image positioning rule, and use the determined patterns as position detection patterns of the QR code image.

In a specific implementation, for example, a position detection pattern in a black-and-white QR code used by ALIPAY is in a 1:1:3:1:1 mode, and three concentric squares are a 7×7 black module, a 5×5 white module, and a 3×3 black module. In this case, the row pixel detection rule can be that a quantity of consecutively arranged black pixels reaches a quantity of black pixels in the 7×7 black module, and the column pixel detection rule can be that a quantity of consecutively arranged black pixels reaches the quantity of black pixels in the 7×7 black module. A first pixel arrangement that satisfies the row pixel detection rule is located in a first area of the position detection pattern, and a second pixel arrangement that satisfies the column pixel detection rule is located in the first area of the position detection pattern. As such, the candidate position detection patterns in the QR code can be quickly identified.

In this implementation of the present application, the centers of the candidate position detection patterns in the QR code image are determined based on the arrangement ratio of a first-type pixel, a second-type pixel, and a first-type pixel or based on the quantity of consecutively arranged first-type pixels or the quantity of consecutively arranged second-type pixels, which has certain fault tolerance. As such, the candidate position detection patterns can be identified even if the position detection patterns of the QR code are stained or are weak in brightness, thereby improving identification validity of the candidate position detection patterns. In addition, after the candidate position detection patterns are identified by using the previous method, the position detection patterns of the QR code are determined from the identified candidate position detection patterns, so that accuracy is relatively high.

Figure 7:
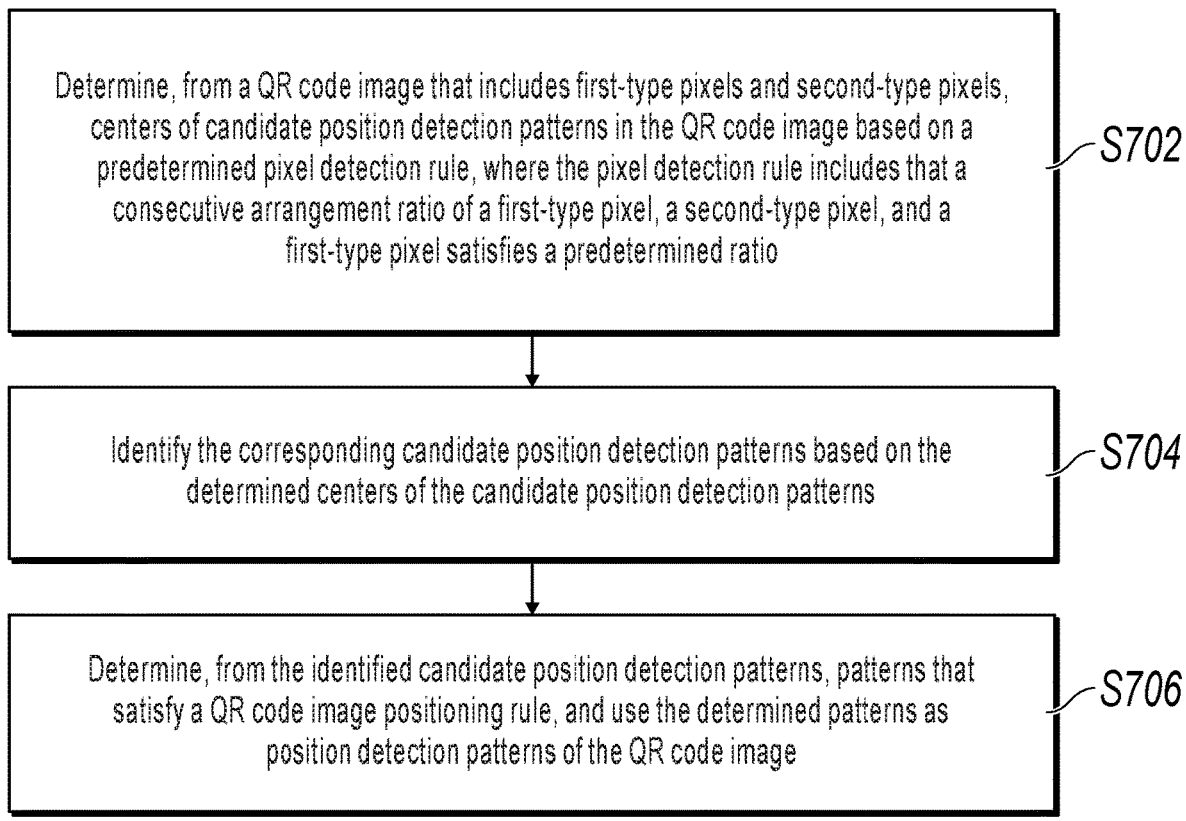
FIG. 7 is a fourth schematic flowchart illustrating a QR code positioning method, according to an implementation of the present application.

Based on the methods in FIG. 1 to FIG. 5, an implementation of the present application further provides a QR code positioning method. FIG. 7 is a fourth schematic flowchart illustrating a QR code positioning method, according to an implementation of the present application. The method can be executed by a terminal or a server. For the method shown in FIG. 7, a difference from the methods in FIG. 1 to FIG. 5 is mainly described here. For the same parts, references can be made to the previous descriptions in FIG. 1 to FIG. 5, and details are omitted here. As shown in FIG. 7, the method includes the following steps.

Step S702: Determine, from a QR code image that includes first-type pixels and second-type pixels, centers of candidate position detection patterns in the QR code image based on a predetermined pixel detection rule, where the pixel detection rule includes that a consecutive arrangement ratio of a first-type pixel, a second-type pixel, and a first-type pixel satisfies a predetermined ratio.

The predetermined ratio can be 1:5:1 for a QR code used by ALIPAY at a current stage.

In this implementation of the present application, the first-type pixel is a foreground color pixel, and the second-type pixel is a background color pixel. Specifically, the first-type pixel is a black pixel or a blue pixel, and the second-type pixel is a pixel whose color difference with the first-type pixel exceeds a specified threshold. For example, the second-type pixel can be white.

Certainly, in addition to the black pixel and the blue pixel, the first-type pixel can be a pixel in another color.

Currently, QR codes used by ALIPAY include a black-and-white QR code, a blue-and-white QR code, etc. Therefore, in a specific implementation, the first-type pixel is a black pixel, and the second-type pixel is a white pixel. In another implementation, the first-type pixel is a blue pixel, and the second-type pixel is a white pixel.

Step S704: Identify the corresponding candidate position detection patterns based on the determined centers of the candidate position detection patterns.

Step S706: Determine, from the identified candidate position detection patterns, patterns that satisfy a QR code image positioning rule, and use the determined patterns as position detection patterns of the QR code image.

Figure 8:
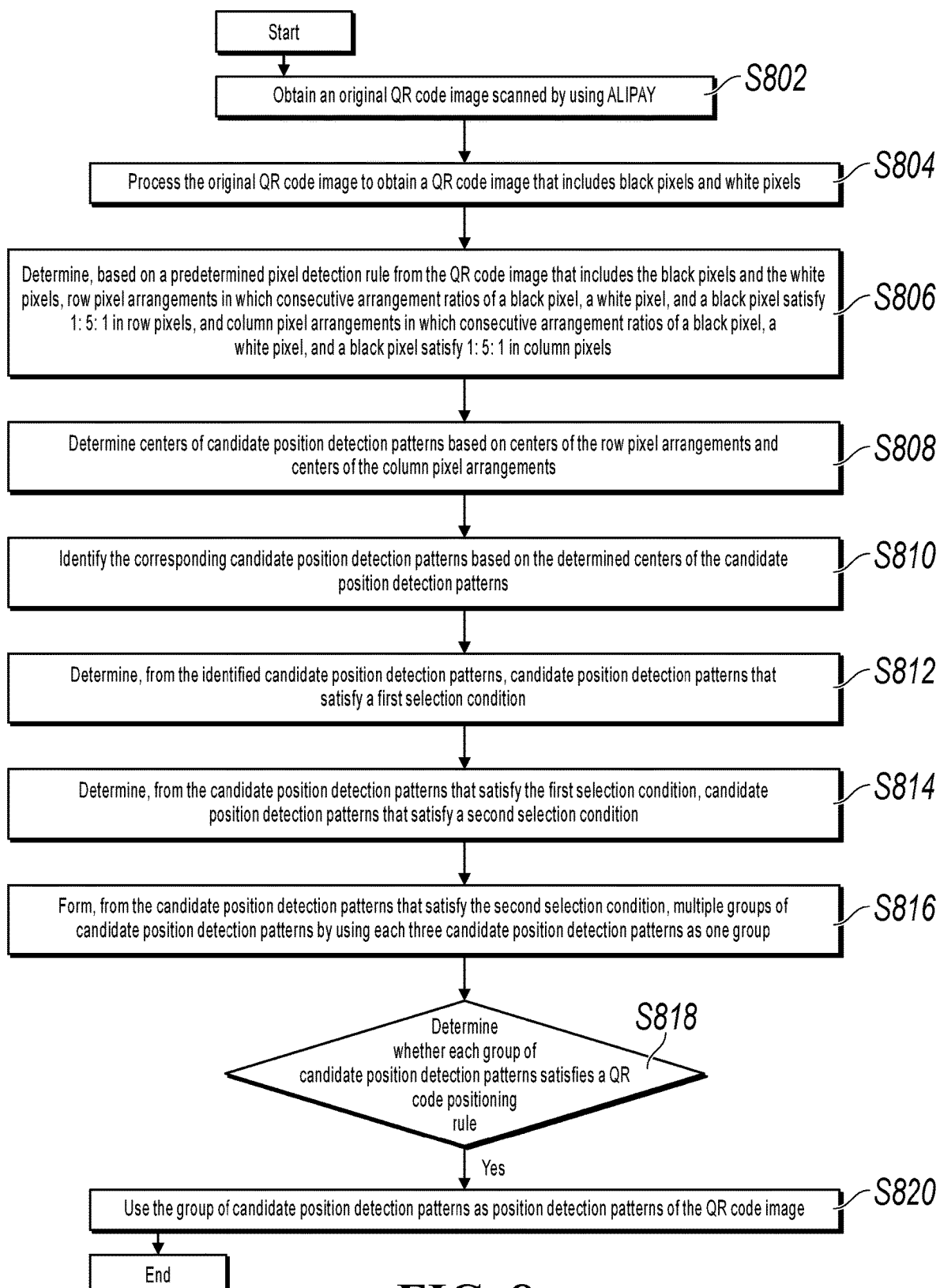
FIG. 8 is a fifth schematic flowchart illustrating a QR code positioning method, according to an implementation of the present application.

A black-and-white QR code used by ALIPAY is used as an example. A specific QR code positioning method is now described with reference to a specific application scenario. FIG. 8 is a fifth schematic flowchart illustrating a QR code positioning method, according to an implementation of the present application. The method can be executed by a terminal or a server. As shown in FIG. 8, the method includes the following steps:

Step S802: Obtain an original QR code image scanned by using ALIPAY.

Step S804: Process the original QR code image to obtain a QR code image that includes black pixels and white pixels.

The processing the original QR code image can include denoising, binarization, etc.

Step S806: Determine, based on a predetermined pixel detection rule from the QR code image that includes the black pixels and the white pixels, row pixel arrangements in which consecutive arrangement ratios of a black pixel, a white pixel, and a black pixel satisfy 1:5:1 in row pixels, and column pixel arrangements in which consecutive arrangement ratios of a black pixel, a white pixel, and a black pixel satisfy 1:5:1 in column pixels.

Step S808: Determine centers of candidate position detection patterns based on centers of the row pixel arrangements and centers of the column pixel arrangements.

Step S810: Identify the corresponding candidate position detection patterns based on the determined centers of the candidate position detection patterns.

Step S812: Determine, from the identified candidate position detection patterns, candidate position detection patterns that satisfy a first selection condition.

Step S814: Determine, from the candidate position detection patterns that satisfy the first selection condition, candidate position detection patterns that satisfy a second selection condition.

Step S816: Form, from the candidate position detection patterns that satisfy the second selection condition, multiple groups of candidate position detection patterns by using each three candidate position detection patterns as one group.

Step S818: Determine whether each group of candidate position detection patterns satisfies a QR code positioning rule; and if yes, perform step S820.

Step S820: Use the group of candidate position detection patterns as position detection patterns of the QR code image.

According to the previously described QR code positioning method, the centers of the candidate position detection patterns in the QR code image are determined based on the arrangement ratio of a first-type pixel, a second-type pixel, and a first-type pixel, which has certain fault tolerance. As such, the candidate position detection patterns can be identified even if the position detection patterns of the QR code are stained or are weak in brightness, thereby improving identification validity of the candidate position detection patterns. In addition, after the candidate position detection patterns are identified by using the previous method, the position detection patterns of the QR code are determined from the identified candidate position detection patterns, so that accuracy is relatively high.

Figure 9:
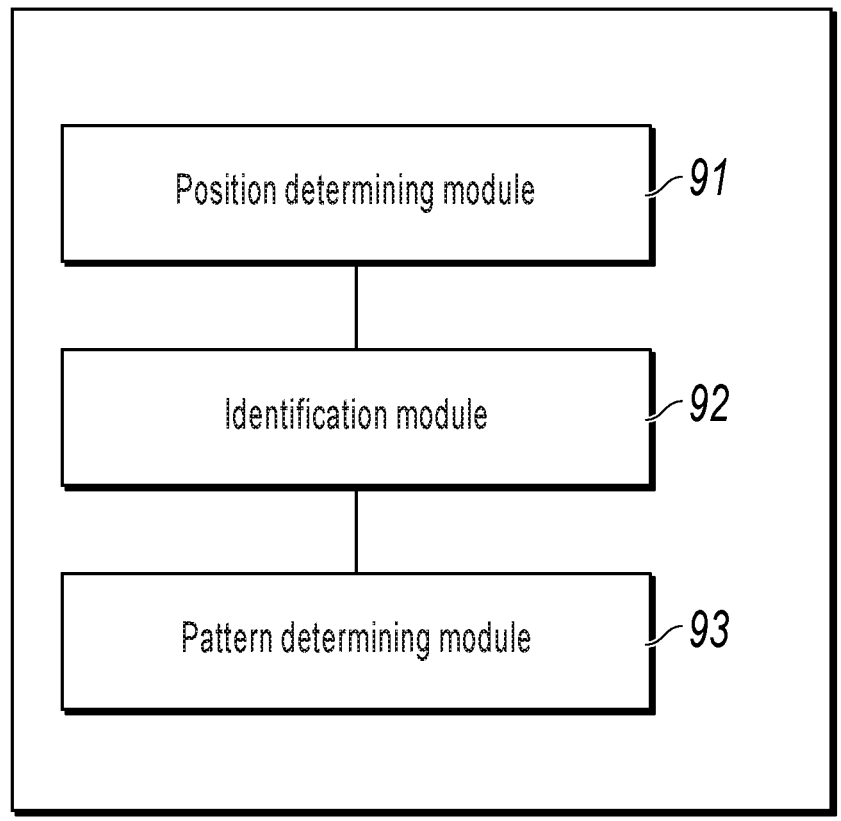
FIG. 9 is a schematic diagram illustrating module composition of a QR code positioning apparatus, according to an implementation of the present application.

Corresponding to the previous QR code positioning method, based on a same idea, an implementation of the present application further provides a QR code positioning apparatus, which can be applied to a terminal side or a server side. FIG. 9 is a schematic diagram illustrating module composition of a QR code positioning apparatus, according to an implementation of the present application. As shown in FIG. 9, the apparatus includes: position determining module 91, configured to determine, from a QR code image that includes first-type pixels and second-type pixels, centers of candidate position detection patterns in the QR code image based on a predetermined row pixel detection rule and a predetermined column pixel detection rule, where the row pixel detection rule includes that a consecutive arrangement ratio of a first-type pixel, a second-type pixel, and a first-type pixel satisfies a first predetermined ratio, and the column pixel detection rule includes that a consecutive arrangement ratio of a first-type pixel, a second-type pixel, and a first-type pixel satisfies a second predetermined ratio; identification module 92, configured to identify the corresponding candidate position detection patterns based on the determined centers of the candidate position detection patterns; and pattern determining module 93, configured to determine, from the identified candidate position detection patterns, patterns that satisfy a QR code image positioning rule, and use the determined patterns as position detection patterns of the QR code image.

Optionally, the first predetermined ratio is 1:n:1, and n is greater than 1; and the second predetermined ratio is 1:m:1, and m is greater than 1.

Optionally, position determining module 91 includes a pixel determining unit and a position determining unit.

The pixel determining unit is configured to determine, from row pixels, first pixel arrangements in which consecutive arrangement ratios of a first-type pixel, a second-type pixel, and a first-type pixel satisfy the first predetermined ratio; and determine, from column pixels, second pixel arrangements in which consecutive arrangement ratios of a first-type pixel, a second-type pixel, and a first-type pixel satisfy the second predetermined ratio. The position determining unit is configured to determine the centers of the candidate position detection patterns based on centers of the first pixel arrangements and centers of the second pixel arrangements.

Optionally, pattern determining module 93 includes a first pattern determining unit and a second pattern determining unit.

The first pattern determining unit is configured to determine, from the identified candidate position detection patterns, candidate position detection patterns that satisfy at least one of a first selection condition and a second selection condition, where the first selection condition includes that at least one of a quantity of first-type pixels and a quantity of second-type pixels within a predetermined area adjacent to the center satisfies a predetermined threshold range, and the second selection condition includes that a consecutive arrangement ratio of a first-type pixel, a second-type pixel, a first-type pixel, a second-type pixel, and a first-type pixel in a third pixel arrangement that passes through the center satisfies a third predetermined ratio. The second determining unit is configured to determine, from the candidate position detection patterns that satisfy at least one of the first selection condition and the second selection condition, the patterns that satisfy the QR code positioning rule.

Optionally, the positioning rule includes that the shortest two lines among the three lines that connect centers of three position detection patterns are perpendicular with each other and are equal in length; and the second pattern determining unit is specifically configured to form, from the candidate position detection patterns that satisfy at least one of the first selection condition and the second selection condition, multiple groups of candidate position detection patterns by using each three candidate position detection patterns as one group; determine whether each group of candidate position detection patterns satisfies the positioning rule; and use at least one group of candidate position detection patterns that satisfy the positioning rule as the position detection patterns of the QR code image.

Optionally, the second pattern determining unit is further specifically configured to form, from the candidate position detection patterns that satisfy at least one of the first selection condition and the second selection condition, multiple groups of candidate position detection patterns by using each three candidate position detection patterns as one group; determine geometric parameters of a triangle formed by connection lines of centers of three candidate position detection patterns in each group of candidate position detection patterns and a standard deviation of areas of the three candidate position detection patterns, where the geometric parameters include a value of an angle between two short connection lines in the triangle and a length difference between the two short connection lines; and determine, based on the value of the angle, the length difference, and the standard deviation, the patterns that satisfy the QR code positioning rule.

Optionally, the second pattern determining unit is specifically configured to determine, by using the following process, the patterns that satisfy the QR code positioning rule: calculating a score of each group of candidate position detection patterns based on the value of the angle, the length difference, and the standard deviation by using the following equation; and comparing the score of each group of candidate position detection patterns with a predetermined score, and determining, based on a comparison result, the patterns that satisfy the QR code positioning rule, where $$f_i = \frac{1}{1 + e^{ax_i + by_i + cz_i + d}}.$$

In the previous equation, a, b, c, and d are all constants, $x_i$ represents a value of an angle between two short connection lines in a triangle formed by connection lines of centers of an ith group of candidate position detection patterns, $y_i$ represents a length difference between the two short connection lines in the triangle formed by the connection lines of the centers of the ith group of candidate position detection patterns, $z_i$ represents a standard deviation of areas of three candidate position detection patterns in the ith group of candidate position detection patterns, and $f_i$ represents a score of the ith group of candidate position detection patterns.

Corresponding to the previous QR code positioning method, based on a same idea, the modules in the QR code positioning apparatus shown in FIG. 9 further specifically have the following functions.

Position determining module 91 is further configured to determine, from a QR code image that includes first-type pixels and second-type pixels, centers of candidate position detection patterns in the QR code image based on a predetermined row pixel detection rule and a predetermined column pixel detection rule, where the row pixel detection rule includes that a quantity of consecutively arranged first-type pixels or a quantity of consecutively arranged second-type pixels reaches a first predetermined threshold, and the column pixel detection rule includes that a quantity of consecutively arranged first-type pixels or a quantity of consecutively arranged second-type pixels reaches a second predetermined threshold.

Identification module 92 is further configured to identify the corresponding candidate position detection patterns based on the determined centers of the candidate position detection patterns.

Pattern determining module 93 is further configured to determine, from the identified candidate position detection patterns, patterns that satisfy a QR code image positioning rule, and use the determined patterns as position detection patterns of the QR code image.

Optionally, the first predetermined threshold is equal to the second predetermined threshold.

Corresponding to the previous QR code positioning method, based on a same idea, the modules in the QR code positioning apparatus shown in FIG. 9 further specifically have the following functions.

Position determining module 91 is further configured to determine, from a QR code image that includes first-type pixels and second-type pixels, centers of candidate position detection patterns in the QR code image based on a predetermined pixel detection rule, where the pixel detection rule includes that a consecutive arrangement ratio of a first-type pixel, a second-type pixel, and a first-type pixel satisfies a predetermined ratio.

Identification module 92 is further configured to identify the corresponding candidate position detection patterns based on the determined centers of the candidate position detection patterns.

Pattern determining module 93 is further configured to determine, from the identified candidate position detection patterns, patterns that satisfy a QR code image positioning rule, and use the determined patterns as position detection patterns of the QR code image.

Optionally, the predetermined ratio is 1:5:1.

Optionally, the first-type pixel is a black pixel or a blue pixel, and the second-type pixel is a pixel whose color difference with the first-type pixel exceeds a specified threshold.

According to the QR code positioning apparatus in this implementation of the present application, the candidate position detection patterns in the QR code are first determined based on the arrangement ratio of a first-type pixel, a second-type pixel, and a first-type pixel or based on the quantity of consecutively arranged first-type pixels or the quantity of consecutively arranged second-type pixels, which has certain fault tolerance. As such, the candidate position detection patterns can be identified even if the position detection patterns of the QR code are stained or are weak in brightness, thereby improving identification validity of the candidate position detection patterns. In addition, after the candidate position detection patterns are identified by using the previous method, the position detection patterns of the QR code are determined from the identified candidate position detection patterns, so that accuracy is relatively high.

Figure 10:
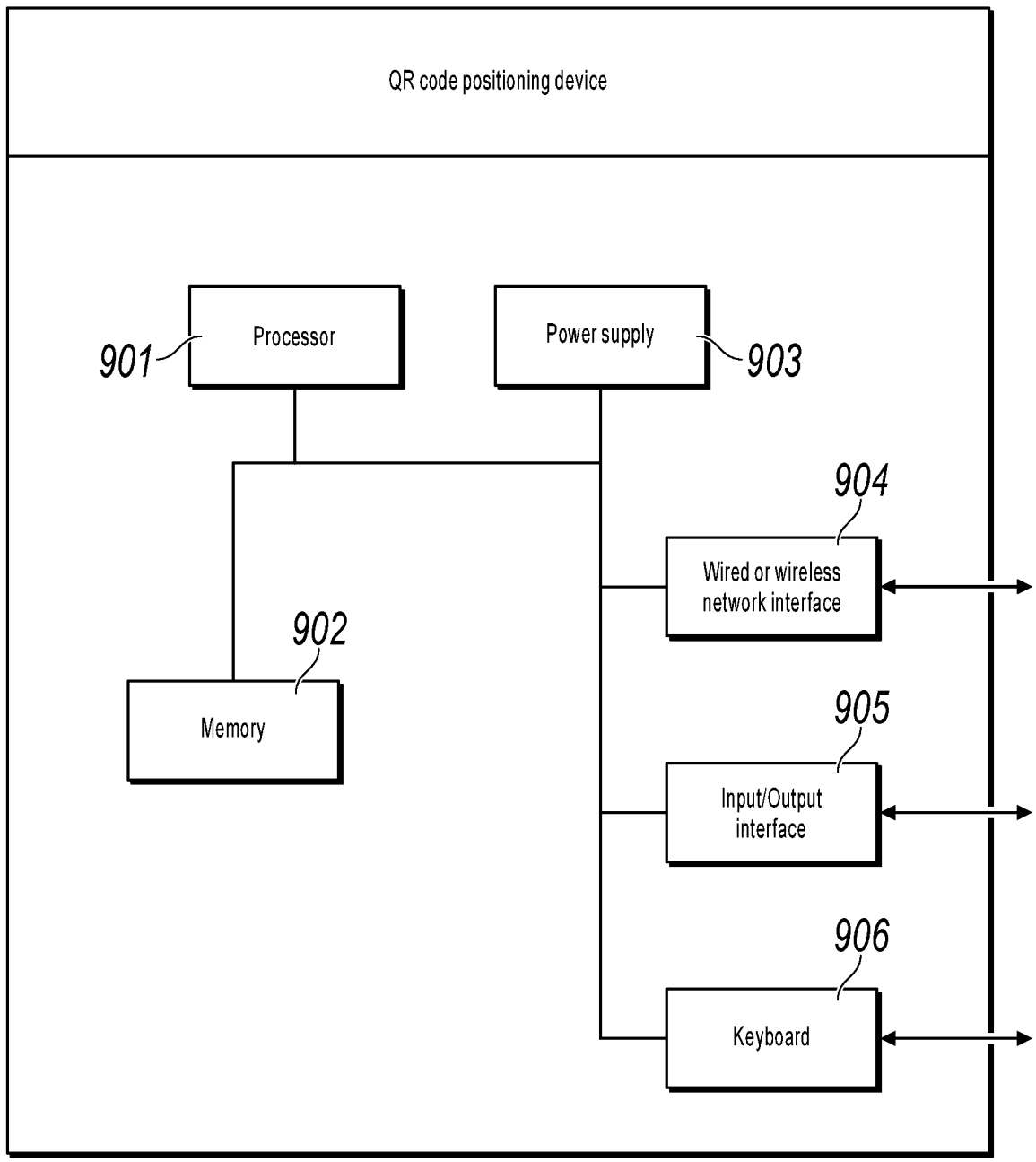
FIG. 10 is a schematic structural diagram illustrating a QR code positioning device, according to an implementation of the present application.

Further, based on the previous methods shown in FIG. 1 to FIG. 8, an implementation of the present application further provides a QR code positioning device, as shown in FIG. 10.

The QR code positioning device can greatly vary with configurations or performances, and can include one or more processors 901 and one or more memories 902. Memory 902 can store one or more application programs or data. Memory 902 can be a temporary storage or a persistent storage. The application program stored in memory 902 can include one or more modules (not shown in the figure), and each module can include a series of computer executable instructions for the QR code positioning device. Further, processor 901 can be configured to communicate with memory 902, and execute a series of computer executable instructions in memory 902 on the QR code positioning device. The QR code positioning device can further include one or more power supplies 903, one or more wired or wireless network interfaces 904, one or more input/output interfaces 905, one or more keyboards 906, etc.

In a specific implementation, the QR code positioning device includes a memory and one or more programs. The one or more programs are stored in the memory. The one or more programs can include one or more modules. Each module can include a series of computer executable instructions for the QR code positioning device. One or more processors are configured to execute the one or more programs, including the following computer executable instructions: determining, from a QR code image that includes first-type pixels and second-type pixels, centers of candidate position detection patterns in the QR code image based on a predetermined row pixel detection rule and a predetermined column pixel detection rule, where the row pixel detection rule includes that a consecutive arrangement ratio of a first-type pixel, a second-type pixel, and a first-type pixel satisfies a first predetermined ratio, and the column pixel detection rule includes that a consecutive arrangement ratio of a first-type pixel, a second-type pixel, and a first-type pixel satisfies a second predetermined ratio; identifying the corresponding candidate position detection patterns based on the determined centers of the candidate position detection patterns; and determining, from the identified candidate position detection patterns, patterns that satisfy a QR code positioning rule, and using the determined patterns as position detection patterns of the QR code.

Optionally, when the computer executable instructions are being executed, the first predetermined ratio is 1:n:1, and n is greater than 1; and the second predetermined ratio is 1:m:1, and m is greater than 1.

Optionally, when the computer executable instructions are being executed, the determining centers of candidate position detection patterns in the QR code image includes: determining, from row pixels, first pixel arrangements in which consecutive arrangement ratios of a first-type pixel, a second-type pixel, and a first-type pixel satisfy the first predetermined ratio; determining, from column pixels, second pixel arrangements in which consecutive arrangement ratios of a first-type pixel, a second-type pixel, and a first-type pixel satisfy the second predetermined ratio; and determining the centers of the candidate position detection patterns based on centers of the first pixel arrangements and centers of the second pixel arrangements.

Optionally, when the computer executable instructions are being executed, the determining, from the identified candidate position detection patterns, patterns that satisfy a QR code image positioning rule includes: determining, from the identified candidate position detection patterns, candidate position detection patterns that satisfy at least one of a first selection condition and a second selection condition, where the first selection condition includes that at least one of a quantity of first-type pixels and a quantity of second-type pixels within a predetermined area adjacent to the center satisfies a predetermined threshold range, and the second selection condition includes that a consecutive arrangement ratio of a first-type pixel, a second-type pixel, a first-type pixel, a second-type pixel, and a first-type pixel in a third pixel arrangement that passes through the center satisfies a third predetermined ratio; and determining, from the candidate position detection patterns that satisfy at least one of the first selection condition and the second selection condition, the patterns that satisfy the QR code positioning rule.

Optionally, the positioning rule includes that the shortest two lines among the three lines that connect centers of three position detection patterns are perpendicular with each other and are equal in length. When the computer executable instructions are being executed, the determining, from the candidate position detection patterns that satisfy at least one of the first selection condition and the second selection condition, the patterns that satisfy the QR code positioning rule includes: forming, from the candidate position detection patterns that satisfy at least one of the first selection condition and the second selection condition, multiple groups of candidate position detection patterns by using each three candidate position detection patterns as one group; determining whether each group of candidate position detection patterns satisfies the positioning rule; and using at least one group of candidate position detection patterns that satisfy the positioning rule as the position detection patterns of the QR code image.

Optionally, when the computer executable instructions are being executed, the determining, from the candidate position detection patterns that satisfy at least one of the first selection condition and the second selection condition, the patterns that satisfy the QR code positioning rule includes: forming, from the candidate position detection patterns that satisfy at least one of the first selection condition and the second selection condition, multiple groups of candidate position detection patterns by using each three candidate position detection patterns as one group; determining geometric parameters of a triangle formed by connection lines of centers of three candidate position detection patterns in each group of candidate position detection patterns and a standard deviation of areas of the three candidate position detection patterns, where the geometric parameters include a value of an angle between two short connection lines in the triangle and a length difference between the two short connection lines; and determining, based on the value of the angle, the length difference, and the standard deviation, the patterns that satisfy the QR code positioning rule.

Optionally, when the computer executable instructions are being executed, the determining, based on the value of the angle, the length difference, and the standard deviation, the patterns that satisfy the QR code positioning rule includes: calculating a score of each group of candidate position detection patterns based on the value of the angle, the length difference, and the standard deviation by using the following equation; and comparing the score of each group of candidate position detection patterns with a predetermined score, and determining, based on a comparison result, the patterns that satisfy the QR code positioning rule, where $$f_i = \frac{1}{1 + e^{ax_i + by_i + cz_i + d}}.$$

In the previous equation, a, b, c, and d are all constants, $x_i$ represents a value of an angle between two short connection lines in a triangle formed by connection lines of centers of an ith group of candidate position detection patterns, $y_i$ represents a length difference between the two short connection lines in the triangle formed by the connection lines of the centers of the ith group of candidate position detection patterns, $z_i$ represents a standard deviation of areas of three candidate position detection patterns in the ith group of candidate position detection patterns, and $f_i$ represents a score of the ith group of candidate position detection patterns.

In a specific implementation, the QR code positioning device includes a memory and one or more programs. The one or more programs are stored in the memory. The one or more programs can include one or more modules. Each module can include a series of computer executable instructions for the QR code positioning device. One or more processors are configured to execute the one or more programs, including the following computer executable instructions: determining, from a QR code image that includes first-type pixels and second-type pixels, centers of candidate position detection patterns in the QR code image based on a predetermined row pixel detection rule and a predetermined column pixel detection rule, where the row pixel detection rule includes that a quantity of consecutively arranged first-type pixels or a quantity of consecutively arranged second-type pixels reaches a first predetermined threshold, and the column pixel detection rule includes that a quantity of consecutively arranged first-type pixels or a quantity of consecutively arranged second-type pixels reaches a second predetermined threshold; identifying the corresponding candidate position detection patterns based on the determined centers of the candidate position detection patterns; and determining, from the identified candidate position detection patterns, patterns that satisfy a QR code image positioning rule, and using the determined patterns as position detection patterns of the QR code image.

Optionally, when the computer executable instructions are being executed, the first predetermined threshold is equal to the second predetermined threshold.

In a specific implementation, the QR code positioning device includes a memory and one or more programs. The one or more programs are stored in the memory. The one or more programs can include one or more modules. Each module can include a series of computer executable instructions for the QR code positioning device. One or more processors are configured to execute the one or more programs, including the following computer executable instructions: determining, from a QR code image that includes first-type pixels and second-type pixels, centers of candidate position detection patterns in the QR code image based on a predetermined pixel detection rule, where the pixel detection rule includes that a consecutive arrangement ratio of a first-type pixel, a second-type pixel, and a first-type pixel satisfies a predetermined ratio; identifying the corresponding candidate position detection patterns based on the determined centers of the candidate position detection patterns; and determining, from the identified candidate position detection patterns, patterns that satisfy a QR code image positioning rule, and using the determined patterns as position detection patterns of the QR code image.

Optionally, when the computer executable instructions are being executed, the predetermined ratio is 1:5:1.

Optionally, when the computer executable instructions are being executed, the first-type pixel is a black pixel or a blue pixel, and the second-type pixel is a pixel whose color difference with the first-type pixel exceeds a specified threshold.

In this implementation of the present application, after the executable instructions stored in the storage medium are executed, the candidate position detection patterns in the QR code are first determined based on the arrangement ratio of a first-type pixel, a second-type pixel, and a first-type pixel or based on the quantity of consecutively arranged first-type pixels or the quantity of consecutively arranged second-type pixels, which has certain fault tolerance. As such, the candidate position detection patterns can be identified even if the position detection patterns of the QR code are stained or are weak in brightness, thereby improving identification validity of the candidate position detection patterns. In addition, after the candidate position detection patterns are identified by using the previous method, the position detection patterns of the QR code are determined from the identified candidate position detection patterns, so that accuracy is relatively high.

Further, an implementation of the present application further provides a storage medium, configured to store computer executable instructions. In a specific implementation, the storage medium can be a USB flash drive, an optical disc, a hard disk, etc. When the computer executable instructions stored in the storage medium are being executed by a processor, the following procedures can be implemented: determining, from a QR code image that includes first-type pixels and second-type pixels, centers of candidate position detection patterns in the QR code image based on a predetermined row pixel detection rule and a predetermined column pixel detection rule, where the row pixel detection rule includes that a consecutive arrangement ratio of a first-type pixel, a second-type pixel, and a first-type pixel satisfies a first predetermined ratio, and the column pixel detection rule includes that a consecutive arrangement ratio of a first-type pixel, a second-type pixel, and a first-type pixel satisfies a second predetermined ratio; identifying the corresponding candidate position detection patterns based on the determined centers of the candidate position detection patterns; and determining, from the identified candidate position detection patterns, patterns that satisfy a QR code positioning rule, and using the determined patterns as position detection patterns of the QR code.

Optionally, when the computer executable instructions stored in the storage medium are being executed by the processor, the first predetermined ratio is 1:n:1, and n is greater than 1; and the second predetermined ratio is 1:m:1, and m is greater than 1.

Optionally, when the computer executable instructions stored in the storage medium are being executed by the processor, the determining centers of candidate position detection patterns in the QR code image includes: determining, from row pixels, first pixel arrangements in which consecutive arrangement ratios of a first-type pixel, a second-type pixel, and a first-type pixel satisfy the first predetermined ratio; determining, from column pixels, second pixel arrangements in which consecutive arrangement ratios of a first-type pixel, a second-type pixel, and a first-type pixel satisfy the second predetermined ratio; and determining the centers of the candidate position detection patterns based on centers of the first pixel arrangements and centers of the second pixel arrangements.

Optionally, when the computer executable instructions stored in the storage medium are being executed by the processor, the determining, from the identified candidate position detection patterns, patterns that satisfy a QR code image positioning rule includes: determining, from the identified candidate position detection patterns, candidate position detection patterns that satisfy at least one of a first selection condition and a second selection condition, where the first selection condition includes that at least one of a quantity of first-type pixels and a quantity of second-type pixels within a predetermined area adjacent to the center satisfies a predetermined threshold range, and the second selection condition includes that a consecutive arrangement ratio of a first-type pixel, a second-type pixel, a first-type pixel, a second-type pixel, and a first-type pixel in a third pixel arrangement that passes through the center satisfies a third predetermined ratio; and determining, from the candidate position detection patterns that satisfy at least one of the first selection condition and the second selection condition, the patterns that satisfy the QR code positioning rule.

Optionally, the positioning rule includes that the shortest two lines among the three lines that connect centers of three position detection patterns are perpendicular with each other and are equal in length. When the computer executable instructions stored in the storage medium are being executed by the processor, the determining, from the candidate position detection patterns that satisfy at least one of the first selection condition and the second selection condition, the patterns that satisfy the QR code positioning rule includes: forming, from the candidate position detection patterns that satisfy at least one of the first selection condition and the second selection condition, multiple groups of candidate position detection patterns by using each three candidate position detection patterns as one group; determining whether each group of candidate position detection patterns satisfies the positioning rule; and using at least one group of candidate position detection patterns that satisfy the positioning rule as the position detection patterns of the QR code image.

Optionally, when the computer executable instructions stored in the storage medium are being executed by the processor, the determining, from the candidate position detection patterns that satisfy at least one of the first selection condition and the second selection condition, the patterns that satisfy the QR code positioning rule includes: forming, from the candidate position detection patterns that satisfy at least one of the first selection condition and the second selection condition, multiple groups of candidate position detection patterns by using each three candidate position detection patterns as one group; determining geometric parameters of a triangle formed by connection lines of centers of three candidate position detection patterns in each group of candidate position detection patterns and a standard deviation of areas of the three candidate position detection patterns, where the geometric parameters include a value of an angle between two short connection lines in the triangle and a length difference between the two short connection lines; and determining, based on the value of the angle, the length difference, and the standard deviation, the patterns that satisfy the QR code positioning rule.

Optionally, when the computer executable instructions stored in the storage medium are being executed by the processor, the determining, based on the value of the angle, the length difference, and the standard deviation, the patterns that satisfy the QR code positioning rule includes: calculating a score of each group of candidate position detection patterns based on the value of the angle, the length difference, and the standard deviation by using the following equation; and comparing the score of each group of candidate position detection patterns with a predetermined score, and determining, based on a comparison result, the patterns that satisfy the QR code positioning rule, where $$f_i = \frac{1}{1+e^{ax_i+by_i+cz_i+d}}.$$

In the previous equation, a, b, c, and d are all constants, $x_i$ represents a value of an angle between two short connection lines in a triangle formed by connection lines of centers of an ith group of candidate position detection patterns, $y_i$ represents a length difference between the two short connection lines in the triangle formed by the ith group of candidate position detection patterns, $z_i$ represents a standard deviation of areas of three candidate position detection patterns in the ith group of candidate position detection patterns, and $f_i$ represents a score of the ith group of candidate position detection patterns.

Further, an implementation of the present application further provides a storage medium, configured to store computer executable instructions. In a specific implementation, the storage medium can be a USB flash drive, an optical disc, a hard disk, etc. When the computer executable instructions stored in the storage medium are being executed by a processor, the following procedures can be implemented: determining, from a QR code image that includes first-type pixels and second-type pixels, centers of candidate position detection patterns in the QR code image based on a predetermined row pixel detection rule and a predetermined column pixel detection rule, where the row pixel detection rule includes that a quantity of consecutively arranged first-type pixels or a quantity of consecutively arranged second-type pixels reaches a first predetermined threshold, and the column pixel detection rule includes that a quantity of consecutively arranged first-type pixels or a quantity of consecutively arranged second-type pixels reaches a second predetermined threshold; identifying the corresponding candidate position detection patterns based on the determined centers of the candidate position detection patterns; and determining, from the identified candidate position detection patterns, patterns that satisfy a QR code image positioning rule, and using the determined patterns as position detection patterns of the QR code image.

Optionally, when the computer executable instructions stored in the storage medium are being executed by the processor, the first predetermined threshold is equal to the second predetermined threshold.

Further, an implementation of the present application further provides a storage medium, configured to store computer executable instructions. In a specific implementation, the storage medium can be a USB flash drive, an optical disc, a hard disk, etc. When the computer executable instructions stored in the storage medium are being executed by a processor, the following procedures can be implemented: determining, from a QR code image that includes first-type pixels and second-type pixels, centers of candidate position detection patterns in the QR code image based on a predetermined pixel detection rule, where the pixel detection rule includes that a consecutive arrangement ratio of a first-type pixel, a second-type pixel, and a first-type pixel satisfies a predetermined ratio; identifying the corresponding candidate position detection patterns based on the determined centers of the candidate position detection patterns; and determining, from the identified candidate position detection patterns, patterns that satisfy a QR code image positioning rule, and using the determined patterns as position detection patterns of the QR code image.

Optionally, when the computer executable instructions stored in the storage medium are being executed by the processor, the predetermined ratio is 1:5:1.

Optionally, when the computer executable instructions stored in the storage medium are being executed by the processor, the first-type pixel is a black pixel or a blue pixel, and the second-type pixel is a pixel whose color difference with the first-type pixel exceeds a specified threshold.

In this implementation of the present application, after the executable instructions stored in the storage medium are executed, the candidate position detection patterns in the QR code are first determined based on the arrangement ratio of a first-type pixel, a second-type pixel, and a first-type pixel or based on the quantity of consecutively arranged first-type pixels or the quantity of consecutively arranged second-type pixels, which has certain fault tolerance. As such, the candidate position detection patterns can be identified even if the position detection patterns of the QR code are stained or are weak in brightness, thereby improving identification validity of the candidate position detection patterns. In addition, after the candidate position detection patterns are identified by using the previous method, the position detection patterns of the QR code are determined from the identified candidate position detection patterns, so that accuracy is relatively high.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. Almost all designers program an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. A designer performs programming to "integrate" a digital system to a single PLD, without requiring a chip manufacturer to design and manufacture a dedicated integrated circuit chip. In addition, at present, instead of manually manufacturing an integrated circuit chip, this type of programming is mostly implemented by using "logic compiler" software. The "logic compiler" software is similar to a software compiler used to develop and write a program. Original code needs to be written in a particular programming language before being compiled. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used at present. A person skilled in the art should also understand that a hardware circuit that implements a logical method procedure can be readily obtained provided that the method procedure is logically programmed by using several described hardware description languages and is programmed into an integrated circuit.

A controller can be implemented by using any appropriate method. For example, the controller can be in a form of a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Alternatively, the apparatus configured to implement various functions can even be considered as both a software module implementing the method and a structure in the hardware component.

The system, apparatus, module, or unit illustrated in the previous implementations can be specifically implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the previous apparatus is divided to various units based on functions for description when the previous apparatus is described. Certainly, when the present application is implemented, the functions of the units can be implemented in one or more pieces of software and/or hardware.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a magnetic disk memory, a CD-ROM, an optical memory, etc.) that include computer-usable program code.

The present application is described with reference to the flowcharts and/or block diagrams of the method, the device (system), and the computer program product according to the implementations of the present application. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of other programmable data processing devices to generate a machine, so that the instructions executed by the computer or the processor of other programmable data processing devices generate an apparatus for implementing a specific function in one or more processes in the flowcharts and/or in one or more blocks in the block diagrams.

These computer program instructions can be stored in a computer readable memory that can instruct the computer or the other programmable data processing devices to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or other programmable data processing devices, so that a series of operations and steps are performed on the computer or the other programmable devices, thereby generating computer-implemented processing. Therefore, the instructions executed on the computer or other programmable devices provide steps for implementing a specific function in one or more processes in the flowcharts and/or in one or more blocks in the block diagrams.

In a typical configuration, a computing device includes one or more processors (CPUs), input/output interfaces, network interfaces, and memories.

The memory may include a non-persistent memory, a random access memory (RAM), and/or a nonvolatile memory in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase-change RAM (PRAM), a static RAM (SRAM), a dynamic RAM (DRAM), a RAM of another type, a ROM, an electrically erasable programmable read only memory (EEPROM), a flash memory or another memory technology, a compact disc read-only memory (CD-ROM), a digital versatile disc (DVD) or another optical storage, a cassette, a cassette magnetic disk storage or another magnetic storage device, or any other non-transmission medium. The computer storage medium can be configured to store information that can be accessed to a computing device. As described in the present application, the computer readable medium does not include computer readable transitory media such as a modulated data signal and a carrier.

It is worthwhile to further note that, the terms "comprise" and "include", or any other variants thereof are intended to cover a non-exclusive inclusion, so that a process, method, product or device that includes a list of elements not only includes those elements but also includes other elements that are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a magnetic disk memory, a CD-ROM, an optical memory, etc.) that include computer-usable program code.

The present application can be described in the general context of a computer executable instruction executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations of the present specification are described in a progressive way. For same or similar parts of the implementations, mutual references can be made to the implementations. Each implementation focuses on a difference from other implementations. Particularly, a system implementation is basically similar to a method implementation, and therefore is described briefly. For related parts, references can be made to related descriptions in the method implementation.

The previous implementations are merely implementations of the present application, and are not intended to limit the present application. A person skilled in the art can make various modifications and changes to the present application. Any modification, equivalent replacement, improvement, etc. made without departing from the spirit and principle of the present application shall fall within the scope of the claims of the present application.

What is claimed is:

1. A computer-implemented method, comprising:
    determining, by a computing device, from a QR code image that comprises first-type pixels and second-type pixels, centers of candidate position detection patterns in the QR code image based on a predetermined pixel detection rule, wherein the predetermined pixel detection rule comprises that a consecutive arrangement ratio of the first-type pixels, the second-type pixels, and the first-type pixels satisfies a predetermined ratio;
    identifying, by the computing device, the candidate position detection patterns based on the centers of the candidate position detection patterns;
    determining, by the computing device, from the candidate position detection patterns, a set of patterns that satisfies a QR code image positioning rule; and
    using, by the computing device, the set of patterns as position detection patterns of the QR code image.

2. The computer-implemented method of claim 1, wherein the predetermined ratio is 1:5:1.

3. The computer-implemented method of claim 1, wherein a pixel of the first-type pixels is a black pixel or a blue pixel, and a pixel of the second-type pixels is a pixel whose color difference with the pixel of the first-type pixels exceeds a specified threshold.

4. The computer-implemented method of claim 1, wherein the predetermined pixel detection rule comprises a row pixel detection rule and a column pixel detection rule, and wherein the row pixel detection rule comprises that a first consecutive arrangement ratio of the first-type pixels, the second-type pixels, and the first-type pixels satisfies a first predetermined ratio, and the column pixel detection rule comprises that a second consecutive arrangement ratio of the first-type pixels, the second-type pixels, and the first-type pixels satisfies a second predetermined ratio.

5. The computer-implemented method of claim 4, wherein the first predetermined ratio is 1:n:1, and n is greater than 1; and the second predetermined ratio is 1:m:1, and m is greater than 1.

6. The computer-implemented method of claim 4, wherein determining the centers of the candidate position detection patterns in the QR code image comprises:
    determining, from row pixels of the QR code image, first pixel arrangements, wherein in each one of the first pixel arrangements, the first consecutive arrangement ratio of the first-type pixels, the second-type pixels, and the first-type pixels satisfies the first predetermined ratio;
    determining, from column pixels of the QR code image, second pixel arrangements, wherein in each one of the second pixel arrangements, the second consecutive arrangement ratio of the first-type pixels, the second-type pixels, and the first-type pixels satisfies the second predetermined ratio; and
    determining the centers of the candidate position detection patterns based on centers of the first pixel arrangements and centers of the second pixel arrangements.

7. The computer-implemented method of claim 4, wherein determining the set of patterns that satisfies the QR code image positioning rule comprises:
    determining, from the candidate position detection patterns, a final set of candidate position detection patterns that satisfies at least one of a first selection condition and a second selection condition, wherein the first selection condition comprises that at least one of a quantity of the first-type pixels and a quantity of the second-type pixels within a predetermined area adjacent to the center of each candidate position detection pattern in the final set of candidate position detection patterns satisfies a predetermined threshold range, and wherein the second selection condition comprises that a third consecutive arrangement ratio of the first-type pixels, the second-type pixels, the first-type pixels, the second-type pixels, and the first-type pixels in a third pixel arrangement that passes through the center satisfies a third predetermined ratio; and
    determining, from the final set of candidate position detection patterns that satisfies at least one of the first selection condition and the second selection condition, the set of patterns that satisfies the QR code image positioning rule.

8. A non-transitory, computer-readable medium storing one or more instructions executable by a computer system to perform operations comprising:
    determining, by a computing device, from a QR code image that comprises first-type pixels and second-type pixels, centers of candidate position detection patterns in the QR code image based on a predetermined pixel detection rule, wherein the predetermined pixel detection rule comprises that a consecutive arrangement ratio of the first-type pixels, the second-type pixels, and the first-type pixels satisfies a predetermined ratio;
    identifying, by the computing device, the candidate position detection patterns based on the centers of the candidate position detection patterns;
    determining, by the computing device, from the candidate position detection patterns, a set of patterns that satisfies a QR code image positioning rule; and
    using, by the computing device, the set of patterns as position detection patterns of the QR code image.

9. The non-transitory, computer-readable medium of claim 8, wherein the predetermined ratio is 1:5:1.

10. The non-transitory, computer-readable medium of claim 8, wherein a pixel of the first-type pixels is a black pixel or a blue pixel, and a pixel of the second-type pixels is a pixel whose color difference with the pixel of the first-type pixels exceeds a specified threshold.

11. The non-transitory, computer-readable medium of claim 8, wherein the predetermined pixel detection rule comprises a row pixel detection rule and a column pixel detection rule, and wherein the row pixel detection rule comprises that a first consecutive arrangement ratio of the first-type pixels, the second-type pixels, and the first-type pixels satisfies a first predetermined ratio, and the column pixel detection rule comprises that a second consecutive arrangement ratio of the first-type pixels, the second-type pixels, and the first-type pixels satisfies a second predetermined ratio.

12. The non-transitory, computer-readable medium of claim 11, wherein the first predetermined ratio is 1:n:1, and n is greater than 1; and the second predetermined ratio is 1:m: 1, and m is greater than 1.

13. The non-transitory, computer-readable medium of claim 11, wherein determining the centers of the candidate position detection patterns in the QR code image comprises:
   determining, from row pixels of the QR code image, first pixel arrangements, wherein in each one of the first pixel arrangements, the first consecutive arrangement ratio of the first-type pixels, the second-type pixels, and the first-type pixels satisfies the first predetermined ratio;
   determining, from column pixels of the QR code image, second pixel arrangements, wherein in each one of the second pixel arrangements, the second consecutive arrangement ratio of the first-type pixels, the second-type pixels, and the first-type pixels satisfies the second predetermined ratio; and
   determining the centers of the candidate position detection patterns based on centers of the first pixel arrangements and centers of the second pixel arrangements.

14. The non-transitory, computer-readable medium of claim 11, wherein determining the set of patterns that satisfies the QR code image positioning rule comprises:
   determining, from the candidate position detection patterns, a final set of candidate position detection patterns that satisfies at least one of a first selection condition and a second selection condition, wherein the first selection condition comprises that at least one of a quantity of the first-type pixels and a quantity of the second-type pixels within a predetermined area adjacent to the center of each candidate position detection pattern in the final set of candidate position detection patterns satisfies a predetermined threshold range, and wherein the second selection condition comprises that a third consecutive arrangement ratio of the first-type pixels, the second-type pixels, the first-type pixels, the second-type pixels, and the first-type pixels in a third pixel arrangement that passes through the center satisfies a third predetermined ratio; and
   determining, from the final set of candidate position detection patterns that satisfies at least one of the first selection condition and the second selection condition, the set of patterns that satisfies the QR code image positioning rule.

15. A computer-implemented system, comprising:
   one or more computers; and
   one or more computer memory devices interoperably coupled with the one or more computers and having tangible, non-transitory, machine-readable media storing one or more instructions that, when executed by the one or more computers, perform operations comprising:
      determining, by a computing device, from a QR code image that comprises first-type pixels and second-type pixels, centers of candidate position detection patterns in the QR code image based on a predetermined pixel detection rule, wherein the predetermined pixel detection rule comprises that a consecutive arrangement ratio of the first-type pixels, the second-type pixels, and the first-type pixels satisfies a predetermined ratio;
      identifying, by the computing device, the candidate position detection patterns based on the centers of the candidate position detection patterns;
      determining, by the computing device, from the candidate position detection patterns, a set of patterns that satisfies a QR code image positioning rule; and
      using, by the computing device, the set of patterns as position detection patterns of the QR code image.

16. The computer-implemented system of claim 15, wherein the predetermined ratio is 1:5:1.

17. The computer-implemented system of claim 15, wherein a pixel of the first-type pixels is a black pixel or a blue pixel, and a pixel of the second-type pixels is a pixel whose color difference with the pixel of the first-type pixels exceeds a specified threshold.

18. The computer-implemented system of claim 15, wherein the predetermined pixel detection rule comprises a row pixel detection rule and a column pixel detection rule, and wherein the row pixel detection rule comprises that a first consecutive arrangement ratio of the first-type pixels, the second-type pixels, and the first-type pixels satisfies a first predetermined ratio, and the column pixel detection rule comprises that a second consecutive arrangement ratio of the first-type pixels, the second-type pixels, and the first-type pixels satisfies a second predetermined ratio.

19. The computer-implemented system of claim 18, wherein the first predetermined ratio is 1:n:1, and n is greater than 1; and the second predetermined ratio is 1:m:1, and m is greater than 1.

20. The computer-implemented system of claim 18, wherein determining the centers of the candidate position detection patterns in the QR code image comprises:
   determining, from row pixels of the QR code image, first pixel arrangements, wherein in each one of the first pixel arrangements, the first consecutive arrangement ratio of the first-type pixels, the second-type pixels, and the first-type pixels satisfies the first predetermined ratio;
   determining, from column pixels of the QR code image, second pixel arrangements, wherein in each one of the second pixel arrangements, the second consecutive arrangement ratio of the first-type pixels, the second-type pixels, and the first-type pixels satisfies the second predetermined ratio; and
   determining the centers of the candidate position detection patterns based on centers of the first pixel arrangements and centers of the second pixel arrangements.

* * * * *

UNITED STATES PATENT AND TRADEMARK OFFICE
CERTIFICATE OF CORRECTION

| | | |
|---|---|---|
| PATENT NO. | : 10,929,628 B2 | Page 1 of 1 |
| APPLICATION NO. | : 16/908967 | |
| DATED | : February 23, 2021 | |
| INVENTOR(S) | : Yinhai Tu | |

It is certified that error appears in the above-identified patent and that said Letters Patent is hereby corrected as shown below:

On the Title Page

Column 1, Item (30) Foreign Application Priority Data, Line 1, delete "20171088105.9" and insert -- 201710888105.9 --, therefor.

In the Claims

Column 31, Lines 22-23, in Claim 12, delete "1:m: 1" and insert -- 1:m:1, --, therefor.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*